US005120378A

United States Patent [19]

Porter et al.

[11] Patent Number: 5,120,378

[45] Date of Patent: Jun. 9, 1992

[54] DEVICE AND METHOD FOR PRODUCING WOOD BEAM ASSEMBLIES

[76] Inventors: Charles A. Porter, 3372 NE. Candice Ave.; James Knowles, P.O. Box 1480, both of Jensen Beach, Fla. 34957

[21] Appl. No.: 622,812

[22] Filed: Dec. 5, 1990

[51] Int. Cl.[5] ....... B32B 31/04

[52] U.S. Cl. ....... 156/91; 156/92; 156/258; 156/264; 156/266; 156/512; 156/516; 156/556; 144/344; 144/346; 144/353; 144/354; 144/278 R; 144/287

[58] Field of Search ....... 156/257, 258, 264, 266, 156/304.2, 512, 516, 91, 92, 556; 144/344, 345, 346, 347, 348, 349, 350, 351, 352, 353, 354, 287, 278 R; 118/355, 323

[56] References Cited

U.S. PATENT DOCUMENTS

| | | | |
|---|---|---|---|
| 3,894,908 | 7/1975 | Troutner et al. | 156/257 |
| 4,246,063 | 1/1981 | Gronebaum | 144/344 |
| 4,265,284 | 5/1981 | Taylor | 144/287 |
| 4,356,045 | 10/1982 | Elford et al. | 156/258 |
| 4,463,887 | 8/1984 | Bloys | 144/353 |
| 4,564,410 | 1/1986 | Clitheros et al. | 118/323 |
| 4,708,276 | 11/1987 | Knoth et al. | 144/350 |
| 4,720,318 | 1/1988 | Lines | 156/258 |
| 4,840,207 | 6/1989 | Lines | 156/258 |
| 4,841,907 | 6/1989 | Otsuka | 156/304.5 |

*Primary Examiner*—Caleb Weston

[57] ABSTRACT

A device and method for producing a finished wood material beam assembly and, in particular, a finished prestressed wood material beam assembly. The device includes a support having a top that has movable chord and web adjusters carried thereon. The adjusters may be selectively moved and adjusted as desired both horizontally and vertically, so that the chords and web of the assembly may be received thereon at selected desired heights. As such, the adjusters may be selectively adjusted to precisely conform to the specific size and dimensions of the chords and the web being supported thereby. Securing cylinders and stops carried by the table are also adjustable to securely hold the assembly in place. A prestressing cylinder and prestressing stop carried by the table are also adjustable to prestress a portion of the assembly disposed therebetween. Mechanical and adhesive fasteners are applied to the portions of the assembly by respective devices. In one embodiment, the mechanical and adhesive fasteners are carried by a movable bridge that extends over width of the top and which is movable along the length of the top.

32 Claims, 15 Drawing Sheets

DEVICE AND METHOD FOR PRODUCING WOOD BEAM ASSEMBLIES

FIELD OF THE INVENTION

The present invention relates to devices and methods for producing wood beam assemblies and, in particular, to devices and methods for producing flexurally-reinforced, wood beam assemblies, including post-tensioned, prestressed wood beam assemblies.

BACKGROUND OF THE INVENTION

The concept of reinforcing timber for improving the strength and stiffness thereof at a reasonable cost is well known, dating from at least the late 1800's. Since then, numerous varieties of wood and wood-based materials, that have been "engineered", so as to be reinforced for shear and flexure, have been disclosed. Most prevalent among these has been those varities of wood and wood-based materials that have been flexurally-reinforced.

Flexurally-reinforced wood beam assemblies may be either "prestressed" or "unprestressed". The term "prestressed" refers to those wood beam assemblies into which stresses have been induced (by "prestressing") during the assembly thereof. The term "unprestressed" refers to those wood beam assemblies that have been assembled without any stresses having been induced therein.

There are two broad categories of unprestressed, flexurally-reinforced wood beam assemblies. The first of these are the flitch beam types having vertical reinforcement. The second of these are the types having nonvertical (i.e., horizontal) reinforcing elements, such as flats, rounds, bars, tapes and wires.

Prestressed flexurally-reinforced wood beam assemblies may be either "post-tensioned" or "pretensioned" with or without material, such as bars or wires. In a "post-tensioned", prestressed wood beam assembly, stress is transferred to the wood beam assembly through end bearing plates.

In a "pretensioned" prestressed wood beam assembly, material is highly stressed and then bonded while stressed, so that the stress is transferred to the wood beam assembly through the bond.

Particularly common and attractive varieties of flexurally-reinforced wood beam assemblies include I-beams, T-beams and L-beams. Such assemblies are used as flexurally-loaded beams for joists to support, for example building roof structures and the like. Often, such beam assemblies are compound wooden structures including a lower chord, an upper chord and a web therebetween. Examples of such wood beam assemblies, as well as other closely-related beams, are disclosed in the following United States Letters Patent:

| Inventor | U.S. Pat. No. | Year of Issue |
|---|---|---|
| Troutner, et al. | 3,894,908 | 1975 |
| Sensen | 4,334,346 | 1982 |
| Bloys | 4,463,887 | 1984 |
| Reppel, et al. | 4,500,378 | 1985 |
| Knowles | 4,501,102 | 1985 |
| Curtis, et al. | 4,615,163 | 1986 |
| Knowles | 4,637,194 | 1987 |
| Lines | 4,720,318 | 1988 |
| Lines | 4,846,923 | 1989 |

While wood beam assemblies, and in particular flexurally-reinforced wood beam assemblies, are extremely useful for their purpose, the handling and assembling of such assemblies has proven problematic, especially "on-site" where such handling and assembly necessarily occurs. In particular, the devices of which I am aware that are provided for such handling and assembly are of such a size and complexity that they are neither cost-effective nor is their use feasible in many situations. Further, such devices do not possess sufficient adjustability to permit different varities of wood beam assemblies, having the various shapes, structures and dimensions as required by the job, to be produced thereby. Due to the equipment needed to provide the requisite prestressing pressure, these problems have been especially acute where prestressed assemblies are involved.

Other problems that are encountered with devices of which I am aware for producing wood beam assemblies, and in particular flexurally-reinforced wood beam assemblies, are: (1) those devices of which I am aware only produce assemblies that are constructed by gluing and none are provided for the use of mechanical fasteners in conjunction with or in place of such gluing; and (2) the devices of which I am aware all require the use of additional apparatuses, such as curing ovens and/or clamping racks, to produce the desired wood beam assemblies. In this respect, none of the devices provided produce a complete finished assembly. The provision of a device which can produce assemblies that are constructed using, i.e., mechanical fasteners (such as staples) in addition to or in place of adhesive (such as glue) not only provides the complete assembly with additional strength but also reduces the "down-time" that would otherwise be required in order to let the adhesive properly set and/or dry. The provision of a device that is self-contained, being capable of producing a complete finished assembly, also reduces labor and space requirements.

Accordingly, it can be seen that there remains a need for a device for the "on-site" production of wood beam assemblies, and in particular flexurally-reinforced wood beam assemblies, which device is of a simple construction, size and operation, and which device is readily adjustable for producing various wood beam assemblies having the various sizes, shapes and dimensions needed. It can further be seen that there remains a need for a method for producing such wood beam assemblies using this device.

SUMMARY OF THE INVENTION

It is a primary object of the present invention to provide a device and method for producing wood beam assemblies, and in particular flexurally-reinforced wood beam assemblies, including post-tensioned, prestressed wood beam assemblies.

It is a further primary object of the present invention to provide such a device that is simple in construction and operation and which is readily adaptable for use "on-site".

It is a further primary object of the present invention to provide such a device that is readily adjustable for assembling various different types of wood beam assemblies having various sizes, shapes and dimensions, such as "I-Beam", "L-Beam" and "T-Beam" assemblies.

It is another object of the present invention to provide such a device that assembles the wood beam assembly using, inter alia, mechanical fasteners.

Yet another object of the present invention is to provide such a device that is self-contained, needing no further devices to produce the desired wood beam assembly.

In another aspect of the present invention it is a primary object to provide methods of producing a wood beam assembly, and in particular a prestressed wood beam assembly.

It is another primary object of the present invention to provide methods of using, inter alia, mechanical fasteners to produce a wood beam assembly.

In accordance with the teachings of the present invention, a device is disclosed for assembling (producing) a wood beam assembly. This device has a support including a top for receiving and supporting the assembly thereupon. The top has a pair of side edges with a width therebetween and a pair of end edges with a length therebetween. A movable bridge is positioned extending over the top along the width thereof. The bridge is carried by the support for movement of the bridge along the length of the top. Means is provided that is carried by the movable bridge for movement with the bridge, for securing the web section and the chords to one another. In this fashion, the wood beam assembly is formed.

In further accordance with the teachings of the present invention, a device is disclosed for assembling (producing) a flexurally-reinforced prestressed wood beam assembly having at least one chord and a web section therebetween. The device includes a support, including a top, for receiving and supporting the assembly thereupon. The top has a pair of side edges with a width therebetween and a pair of end edges with a length therebetween. A pair of guide rails is carried by the support. One of said guide rails is located extending along each respective side edge of the top. Means is provided for selectively adjusting the vertical and horizontal positioning of the chords and the web. In this fashion, the chords and the web may be aligned as selected and desired. A prestressing stop plate is carried by the support. The prestressing stop plate is positioned for contacting at least a portion of the assembly. A prestressing pneumatic cylinder is carried by the support. The prestressing pneumatic cylinder is positioned opposite the prestressing stop plate for contacting at least a portion of the assembly, whereby the assembly is prestressed between the prestressing pneumatic cylinder and the prestressing stop plate. A movable bridge is positioned extending over the top along the width thereof. The bridge is carried by the guide rails for movement of the bridge along the length of the top. Finally, means is carried by the bridge for securing the chords to the web section, whereby the flexurally-reinforced prestressed assembly is produced. Said means is movable with the bridge along the length of the top.

Preferably, an adjustment means is provided for selectively adjusting the vertical and horizontal positioning of the chords and the web on the top of the support. This adjustment means includes a plurality of chord and web adjusters that are movably carried by the support. Such adjustment permits selective vertical and horizontal adjustment of the adjusters into desired selected positions in response to the size and shape of the chords and web that are carried thereby.

It is also preferred to provide securing means for removably securing the assembly in position on the top. The means include securing cylinders that are spaced along one of the side edges of the top. This means also includes securing stops (securing stop plates) that are spaced along the other of the side edges of the top.

In another aspect of the present invention, a method is disclosed for producing a wood beam assembly having a web and at least one chord. The web has a desired width and thickness. The width has a top edge and a bottom edge. Each chord has a desired length and thickness. Each chord is substantially perpendicular to the respective edges of the web. The method includes the steps of selectively adjusting the horizontal and vertical positioning of chord adjusters and web adjusters that are carried by a table. The table has said adjusters and a movable bridge above the table including a fastener means carried by the table, so as to be movable along the length of the table. The chord and web adjusters are selectively adjusted as desired to receive the chords and webs thereon at a desired selected height above the table. The web is then placed on the web adjusters and the chords on the chord adjusters. The chords are placed so as to be disposed at one of the side edges of the web. Then, the bridge and the fastening means is moved along at least a portion of the length of the chord and applying fastener means. In this fashion, the chords and the webs are secured to one another, thereby producing the flexurally-reinforced wood beam assembly.

In further accordance with this aspect of the present invention, a method is disclosed for producing a flexurally-reinforced prestressed wood beam assembly having a web and at least one chord. The web has a desired width and thickness. The width has a top edge and a bottom edge. Each chord is substantially perpendicular to the respective edges of the web. The method includes the steps of selectively adjusting the lateral and vertical positioning of chord adjusters and web adjusters that are carried by a table. The table has: opposite front and back edges; opposite first and second ends; a plurality of securing stops disposed on the front edge; a plurality of securing cylinders including respective head portions disposed on the back edge; a prestressing stop disposed on the first end of the table; a prestressing cylinder, including a respective piston head, disposed on the second end of the table; and a movable bridge, including an adhesive fastener means and a mechanical fastener means. The bridge is carried by the table so as to be disposed thereabove, whereby the bridge and the adhesive and mechanical fastener means carried thereby are movable along the length of the table. The chord and web adjusters are adjusted, so as to receive the chords and webs thereon at a selected desired uniform height above the table. The web is placed longitudinally on the web adjusters. The top edge of the width is directed toward the back edge of the table and the bottom edge of the width is directed toward the front edge of the table. The chords are placed on the chord adjusters, such that the chords are disposed longitudinally relative to the web, the width of each chord facing upwardly. The bridge and the adhesive fastener means are moved along at least a portion of the length of the chord and applying the adhesive fastener means (adhesive) to the upward facing width of each chord. The chords are placed longitudinally on the chord adjusters, such that the chords are disposed at the edges of the web, and further such that the adhesive fastener means on the width of each chord contacts the respective edge of the web with the chords being substantially perpendicular to the web. The lateral and vertical positioning of the chord adjusters and the web adjusters are selectively adjusted, so as to receive and position the chords and webs thereon at selected desired uniform heights above the table. The securing stops and the securing cylinders carried by the table are selectively adjusted before the bridge is moved, such that the chords and the web are held therebetween. The horizontal and vertical positioning of the prestressing stop and the prestressing cylinder are selectively adjusted, so that one of the chords is at least partially received therebetween. The prestressing cylinder is then selectively activated before moving the bridge, such that at least the portion of the one of the chords received therebetween is prestressed. The bridge and the mechanical fastener means is then moved along at least a portion of the length of the chord applying the mechanical fastener means to the chord and the web, whereby the prestressed wood beam assembly is produced. Finally, all the cylinders are deactivated, so that the prestressed wood beam assembly is released therefrom.

These and other objects of the present invention will become apparent from a reading of the following specification, taken in conjunction with the enclosed drawings.

BRIEF DESCRIPTION OF THE DRAWINGS

FIG. 12 illustrates how the sizes and the dimensions of the device may be selectively adjusted to produce the desired assembly.

FIG. 13 illustrates the positioning of the components of the assembly on the device and the positioning of the various stops and cylinders in relation to the precise dimensions of the assembly to produce the desired assembly with the prestressing cylinder removed therefrom for the sake of clarity.

FIG. 14 shows the application of adhesive fastener to the assembly of the present invention with the prestressing cylinder removed therefrom for the sake of clarity.

FIG. 15 shows how the chords are repositioned and how the adjusters, stops and cylinders are selectively readjusted, so that the chords may be secured (joined) to the web.

FIG. 16 is an end view corresponding substantially to FIG. 15 and with the mechanical fastener in an elevated position with the prestressing cylinder removed therefrom for the sake of clarity.

FIG. 17 is an end view showing the positioning of the activated cylinders and the mechanical fastener ready for fastening, and further illustrates the use of a mallet for making the final adjustments of the assembly, the prestressing cylinder being removed for the sake of clarity.

FIG. 18 illustrates the application of the mechanical fastener means to produce the assembly of the present invention.

DESCRIPTION OF PREFERRED EMBODIMENTS

Figure 2:
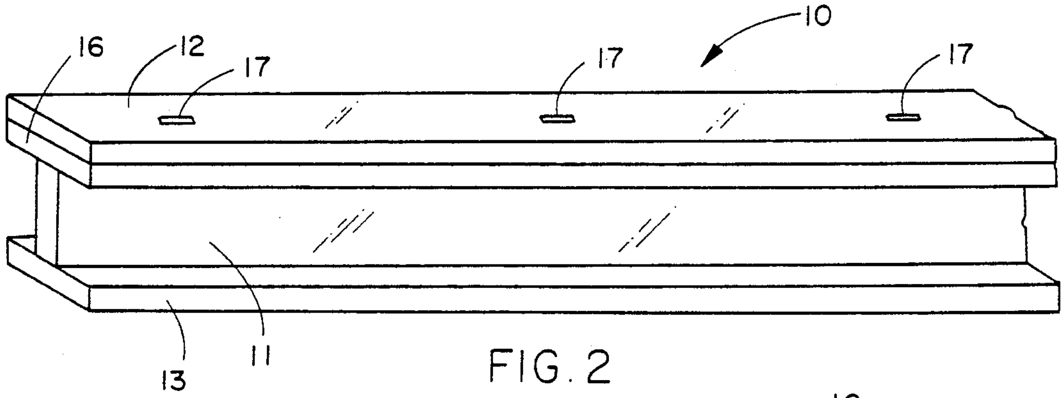
FIG. 2 is a perspective view of a portion of another wood I-beam assembly that can be produced with the device of the present invention.
Figure 3:
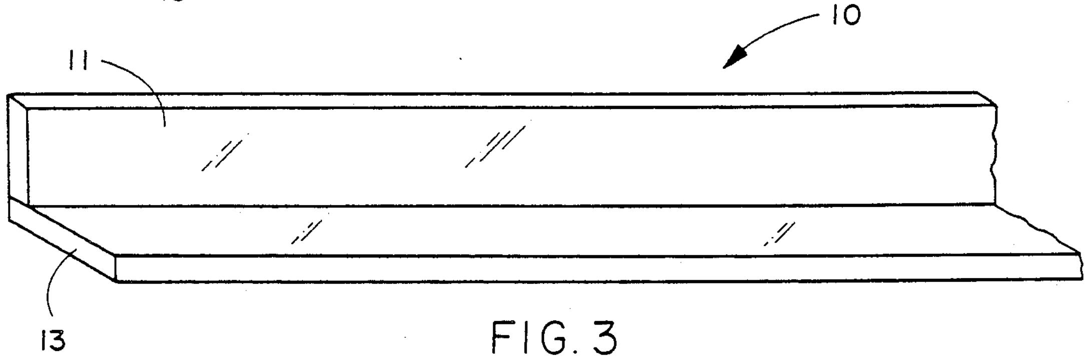
FIG. 3 is a perspective view of a portion of a wood L-beam assembly that can be produced with the device of the present invention.
Figure 4:
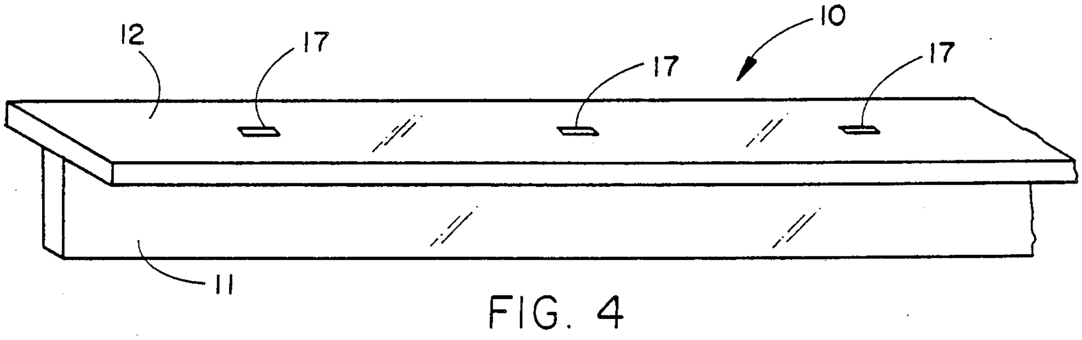
FIG. 4 is a perspective view of a portion of a wood T-beam assembly that can be produced with the device of the present invention.

With reference now to FIGS. 1-4, examples of composite wood beam assemblies 10 that may be produced by the device of the present invention are shown. These include I-beams (FIGS. 1 and 2), L-beams (FIG. 3) and T-beams (FIG. 4). Such assemblies 10 are formed by a web 11 having a particular desired length, width (having a top edge and a bottom edge) and thickness. Such assemblies 10 are further formed by either one or two chords, being a top chord 12 and/or bottom chord 13. Each of the chords 12 and 13 have respective desired lengths, widths (having a center) and thicknesses.

Each of the chords 12 and 13 is disposed being substantially perpendicular to the respective top and bottom edges of the web 11. In this fashion, the chords 12 and 13 are disposed substantially parallel to one another with the web 11 that is located between the chords 12 and 13 being positioned substantially perpendicular thereto, so that a 90° angle is formed therebetween.

Figure 1:
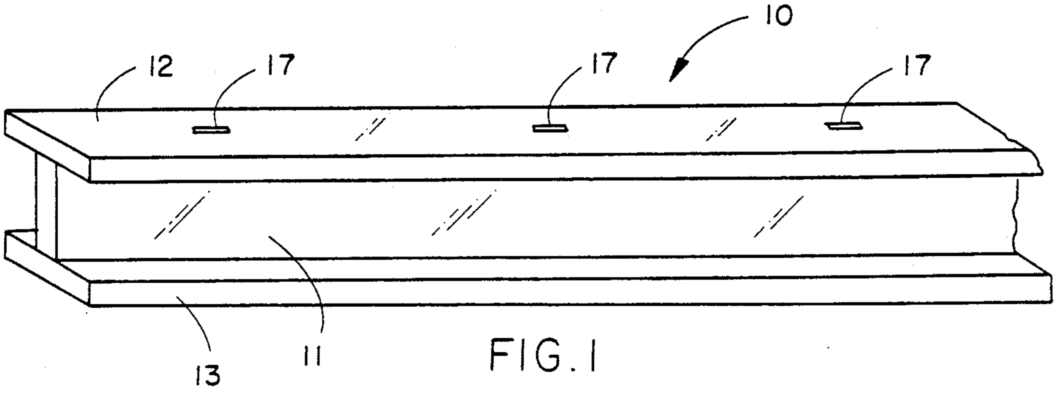
FIG. 1 is a perspective view of a portion of a wood I-beam assembly that can be produced with the device of the present invention.

In the event that an I-beam is being produced, the web 11 is disposed substantially in the center of the width of each chord 12 and 13 (see FIGS. 1 and 2).

In the event that an L-beam is being produced, either the top or bottom edge of the web 11 is disposed flush with the bottom or top of the chord 12 and 13. No second chord is provided (FIG. 3).

In the event that a T-beam is being produced, the web 11 is disposed substantially in the center of the width of the top chord 12. No second chord is provided (FIG. 4).

As a flexurally-reinforced wood beam assembly, if desired, a reinforcing material, such as a steel bar or steel wires, may be provided. In such a case, the reinforcing material is received in an appropriately formed space, such as a dado groove that is formed in either the upper or lower chords 12 and 13 extending along substantially the entire length of the longitudinal axis thereof. In this fashion, the chord 12 or 13 may be disposed flush perpendicular to the web 11 with the reinforcing material therebetween.

If desired, as seen in FIG. 2, a second supplemental upper and/or lower chord 16 may be disposed between, and secured to, the other of the upper of lower chords 12 or 13 and the web 11. This chord 16 is also disposed substantially parallel to the chords 12 and 13 and the web 11.

By way of example, the chords 12 and 13 may be formed from 2×4's, or any other standard or desired size wood material. The web 11 is formed from a 2×4 or other standard (2×6, 2×8, 2×10 or 2×12) or nonstandard desired size wood material or wood components of any depth or thickness.

As shall be discussed at length herein, during production (assembly), the upper and lower chords 12, 13 and 16 are laid on their sides while the web 11 is arranged upright.

The various components 11–16 of the assemblies 10 are joined to one another by suitable fastener means that may include, inter alia, mechanical fasteners. An example of such fastener means is a suitable adhesive, such as glue, that is applied at the joints formed by face-to-face contact of the chords 12 and 13 with the opposite edges of the web 11. Another example of such fastener means are mechanical fastener means 17, such as nails or staples but not limited thereto, that are applied through the top face of the upper chord 12 with the legs thereof disposed extending into the opposite edges of the web 11. Preferably, both adhesive and mechanical fastener means 17 are utilized.

Finally, if desired, the lower chord 13 (or the upper chord 12) or another portion of the assembly 10 is prestressed under compression before fastening of the assembly.

Referring now to FIGS. 5–11, and in particular to FIGS. 5–9, the device 20 of the present invention that produces the flexurally-reinforced wood beam assemblies 10 of FIGS. 1–4 is illustrated.

A support in the form of table 21, including a top 22, having an adjustable length is provided. This adjustability permits the size and dimensions of the table to be selectively adjusted, as desired, so that the components 11–16 of the assembly can be received thereon, as desired. The top 22 also has a pair of side edges (front and back edges) with a width therebetween and a pair of end edges (first and second ends) with a length therebetween. The top 22 receives and supports thereon the assembly 10 that is being produced therewith.

Extending downwardly from the table top 22 are a plurality of support legs 23. Each of the legs 23 terminates in a respective foot 24. In the preferred embodiment of the present invention, the legs are 2″×2″ in dimension while the feet are $4\frac{1}{2}$″×3″ in size.

Disposed extending laterally across the width of the table top 22 are a plurality of inverted U-shaped channels 25. Preferably, at least three such channels 25 are provided, each channel 25 being spaced substantially eighteen inches apart. Disposed thusly, the ends (the front and back edges) of the channels 25 are secured to and supported by the respective side edges (the front and back edges) of the table top 22. In accordance with the length between the end edges of the table top 22, the number of channels 25 provided may be varied. Preferably, the channels 25 are $1\frac{5}{8}$″×3″ in size.

The tops of each of the channels 25 further has a respective longitudinal slot 26 formed therethrough for adjustability purposes that shall be discussed at length herein.

Disposed on and secured to the front edge of each channel 25 (and of the front edge of the table top 22) is a respective securing stop 27, that extends ,upwardly therefrom. Preferably, the securing stops 27 are in the form of angle plates. In the preferred embodiment, these angle plates 27 are 6″×$2\frac{1}{2}$″×2″ in size, and the table is $29\frac{1}{4}$″ in height.

Respective stress producing securing cylinders 28 are disposed along the second back edge of each channel 25, opposite of a respective securing stop 27. Preferably, the cylinders 28 are pneumatic securing cylinders having respective pneumatically driven securing cylinder plates (piston heads) that are oriented so as to face the respective securing stops 27. Disposed thusly, the respective cylinder plates (piston heads) may press against the top surface of the upper chord (along the longitudinal length thereof) and the securing stops 27 may press against the bottom surface of the lower chord (also substantially along the longitudinal length thereof). In this fashion, when the securing cylinder plates are driven by the respective pneumatic securing cylinders 28, the components of the beam assembly may be pressed and secured (held) together for, i.e., application of the fastener means. Preferably, the securing cylinders 28 are substantially 18″ apart.

Air for the pneumatic securing cylinders 28 is provided by respective air lines 29 that are disposed extending between, and in gaseous communication with, a respective securing cylinder 28 at the first end thereof. The second other opposite end of the lines 29 are in gaseous communication with a primary air feed line 30. The primary air feed line 30 is, in turn, in gaseous communication with an air source (not shown).

Figure 7:
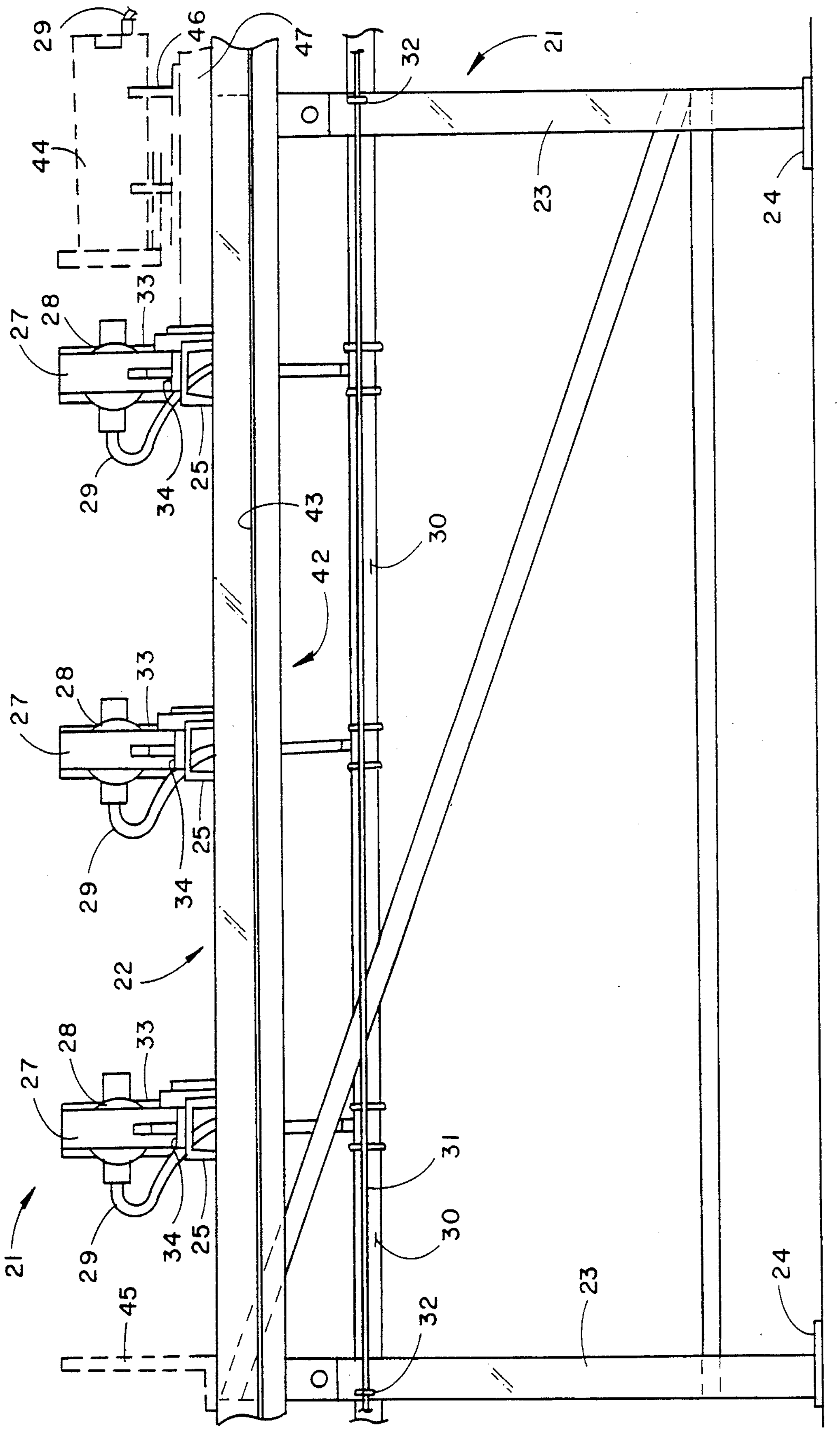
FIG. 7 is a side view of the device, as seem from the left side of FIG. 6 with the prestressing cylinder and the prestressing stop depicted in phantom lines.

The flow of air through the feed line 30 to all securing cylinders 28 is controlled, at least in part, by the cylinder activator rod 31, that acts as a simultaneous on/off switch (see FIG. 7). The rod 31 extends along the front side of the table 21 being located below and substantially parallel to the front edge of the top 22 of the table 21. In this respect, activation and deactivation of the rod 31 may occur by any suitable means such as the pushing or sliding thereof. The rod 31 is supported in place by cylinder activator rod brackets 32 (which, preferably are $1\frac{1}{2}$″×1″ in shape) that are secured to the legs 23 of the table 21, so as to be integral therewith.

Preferably, the securing cylinders 28 are maintained on the channels 25 by means of respective securing cylinder cradles 33. The cradles 33 are carried by respective base plates 34 that are bolted or otherwise suitably and adjustably secured to the top of the channels 25 by respective bolts 35 (see FIG. 6). In the illustrated preferred embodiment, the cradles 33 are $2\frac{3}{4}$×2″ in size, the base plates 34 are 12″×$2\frac{3}{4}$″×$\frac{3}{8}$″ in size and the bolts 35 are $\frac{1}{2}$ inch bolts.

Figure 5:
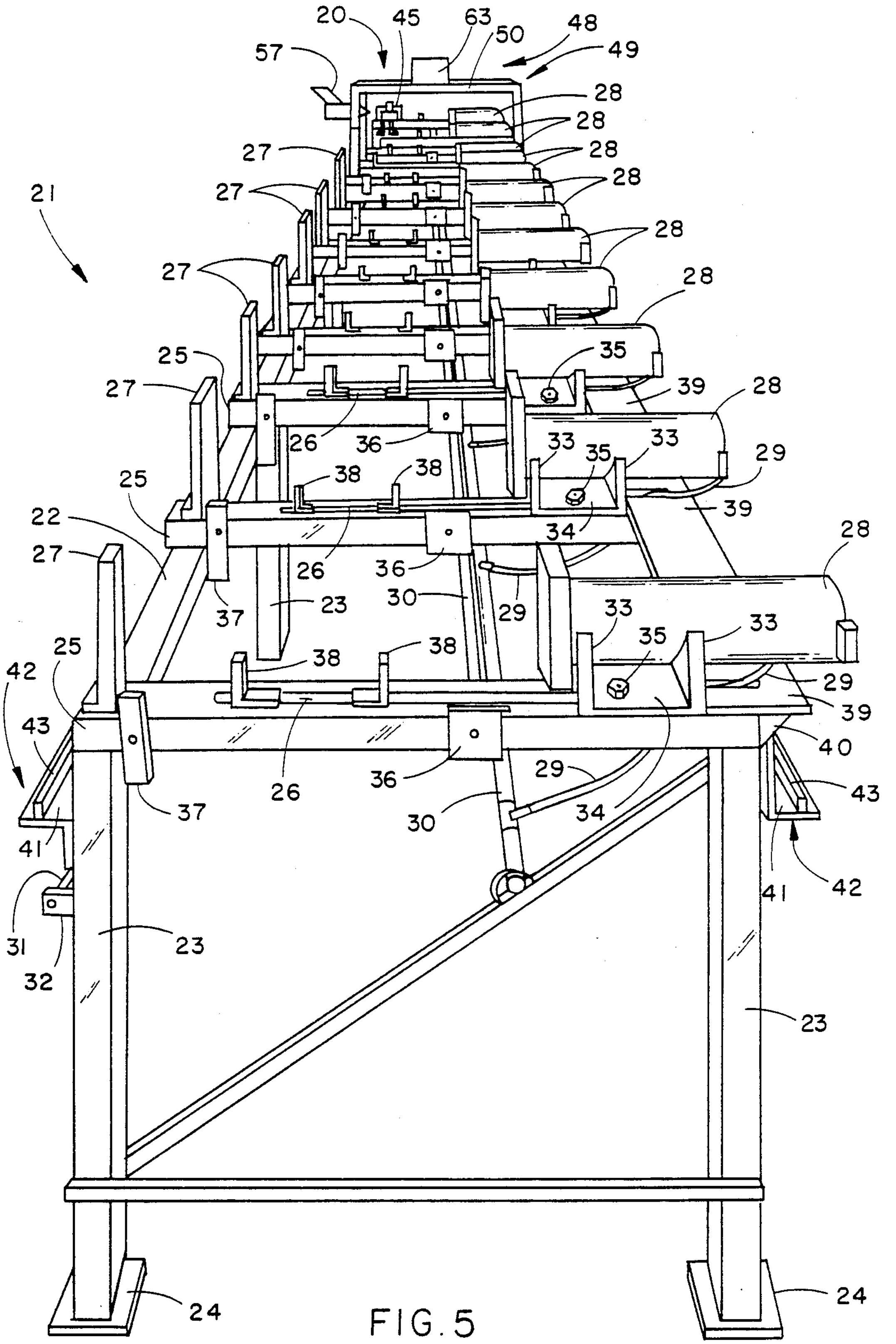
FIG. 5 is a perspective view of the device of the present invention with the prestressing cylinder removed therefrom for the sake of clarity.
Figure 6:
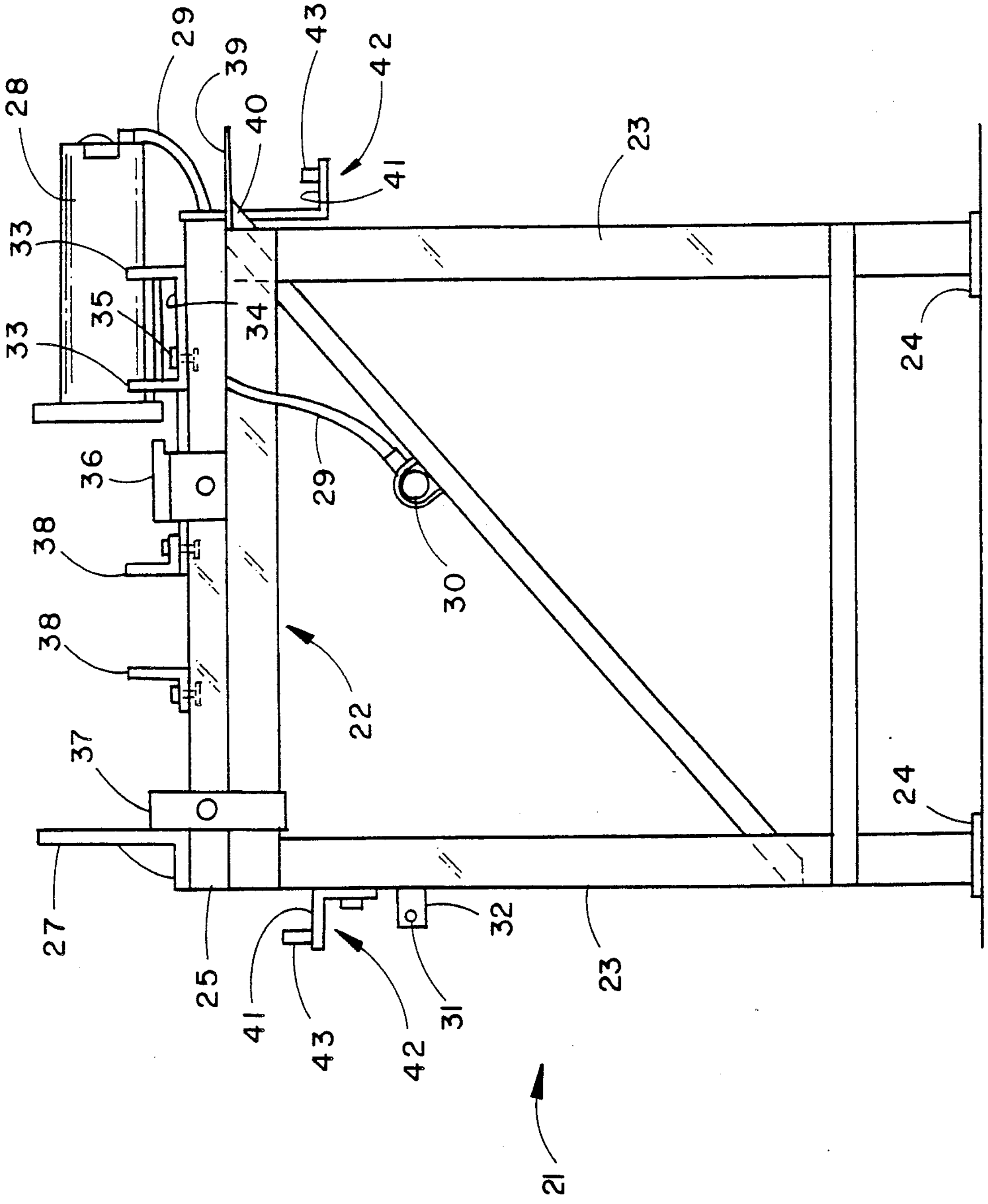
FIG. 6 is an end view of the device of FIG. 5 with the movable bridge and the prestressing cylinder removed therefrom for the sake of clarity.
Figure 8:
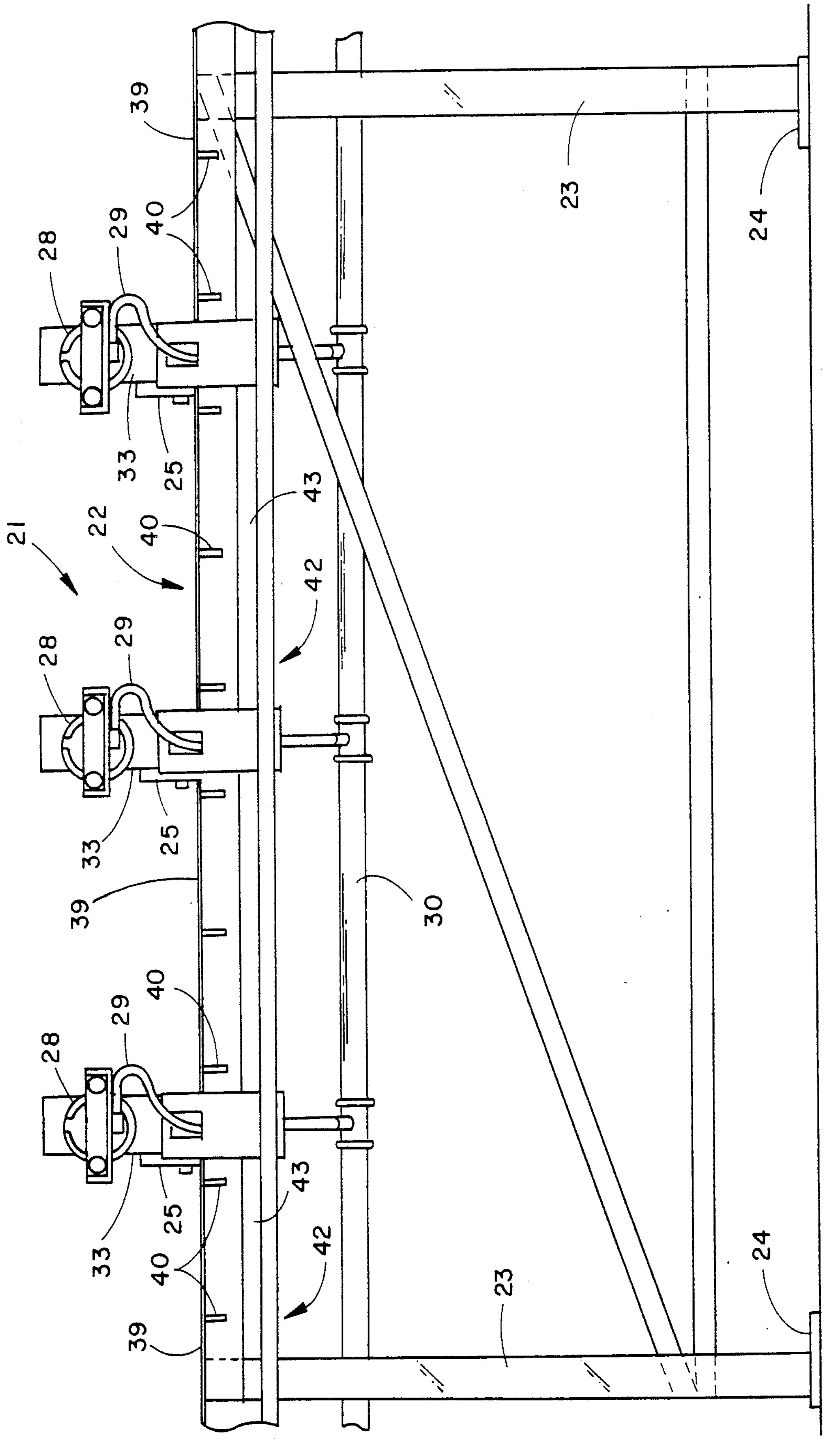
FIG. 8 is a side view of the device, as seen from the right side of FIG. 6 with the prestressing cylinder removed therefrom for the sake of clarity.
Figure 9:
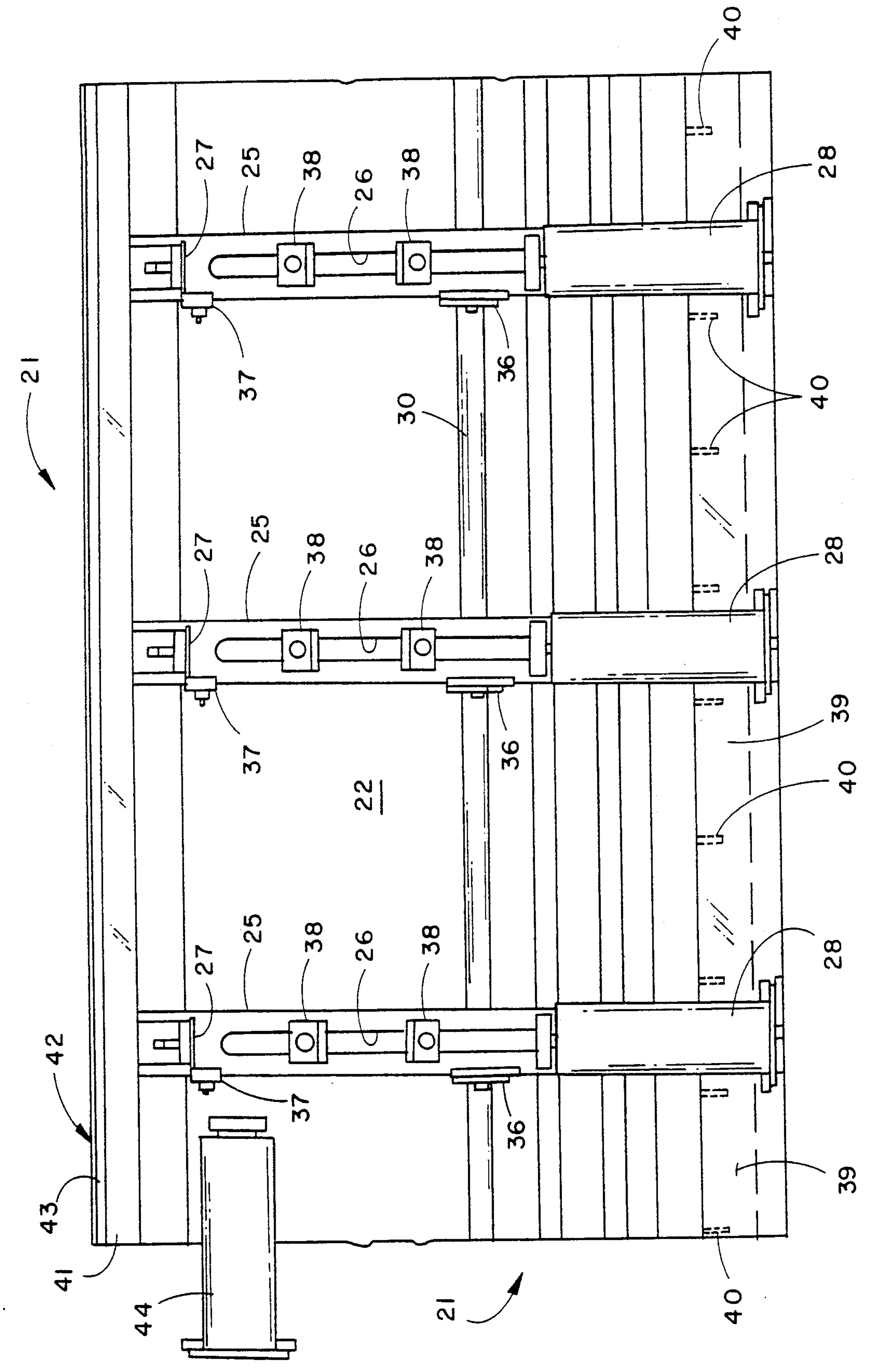
FIG. 9 is an overhead view of the device, as seen in FIG. 6.

With more particular reference now to FIGS. 6–8, in addition to FIGS. 5 and 9, the means by which the device 20 is readily adjustable to produce the various assemblies 10 having the various dimensions is discussed.

Respective chord (first flange or upper chord) adjusters 36 are slidingly disposed on the respective channels 25, so as to be slidably movable along the longitudinal length of the channel 25 (the width of the table top 22). Once positioned as desired, the chord adjusters 26 are removably secured in place by use of a tightening bolt, or other suitable fastening means, that extends through the slots 26, so that the positioning of the chord adjusters 36 may be adjusted along the length of the slots 26. These chord (first flange) adjusters 36 are provided to receive and support the upper (top) chord of the assembly. Respective chord (second flange or bottom chord) adjusters 37 are disposed on the one side of each channel 25, immediately adjacent to a respective securing stop 27. Once positioned as desired, the bottom chord (second flange) adjusters are also removably secured in place by use of respective tightening bolts, or other suitable fastening means, that also extend through the slots 26. The second flange adjuster 37 are provided to receive and support the lower (bottom) chord of the assembly.

In the preferred embodiment illustrated, the upper chord (first flange) adjusters 36 are $2\frac{1}{8}\times 3\frac{3}{4}''$ in shape, the bottom chord (second flange) adjusters 37 are $5''\times 1\frac{1}{4}''\times\frac{3}{4}''$ in shape, and the tightening bolts are $\frac{1}{2}$ inch bolts.

Finally, at least one and preferably two, respective spaced-apart web adjusters 38 are slidingly disposed on the respective channels 25 (and/or the base plates 34). Disposed thusly, the web adjusters 38 are removably secured in place by use of respective tightening bolts, or other suitable fastening means, that also extend through the slots 26, so that the positioning of the adjusters 38 may also be adjusted along the length of the slots 26. Together, the web adjusters 38 and the chord adjusters 36 and 37 provide an adjustment means by which the device 20 is readily selectively adjustable to accommodate the production of various assemblied having various dimensions.

In the embodiment illustrated, the web adjusters 38 are $1\frac{3}{8}''\times 2''$ and $1''\times 1\frac{1}{2}\times 2''$ in size.

It is noted here that the removability of the adjusters 36–38 permits their removal from the table 21 when not in use or when being changed for an adjuster 36–38 of a different height and/or size.

Also contiguous with the longitudinal length of the table top 22, and extending outwardly therefrom on the same side (the back edge) of the table top 22 as the securing cylinders 28, are a plurality of gun rests 39. These gun rests 39 are supported by a series of triangular braces 40. Braces 40 are spaced along the longitudinal length of the table below the back edge thereof. In the embodiment illustrated, the gun rests 39 are $4''\times 14\frac{1}{2}''\times 18''$ in size.

If desired, carried on both sides (the front and back edges) of the table top 22 and extending along the longitudinal length of the table 21 are a pair of guide channels 41. The guide channels 41 are formed from the respective L-shaped guide rail brackets 42 that are at least partially closed by respective guide rails 43. In the embodiment illustrated, the guide rail bracket 42 that extends along the front edge of the table top is $2\frac{1}{2}''\times 2\frac{1}{2}''$ in shape and the guide rail bracket 42 that extends along the rear (back) edge of the table top is $6''\times 2\frac{1}{4}''\times 3''$ in shape. The guide rails 43 are, respectively $1\frac{1}{4}''\times\frac{1}{2}''$ and $\frac{1}{2}''\times\frac{3}{4}''$ in shape. These rails are used in an embodiment which incorporates a movable bridge, as will be discussed.

Finally, with particular reference to FIG. 7, means is carried by the table 21 for prestressing at least a portion of the assembly being produced. This means includes a prestressing cylinder 44 (prestressing pneumatic cylinder) that is located at one lateral end edge (the first end) of the top 22 and a respective prestressing stop 45 that is located oppositely of the cylinder 44, preferably at the opposite lateral end edge (the second end) of the table top 22.

Preferably, the prestressing pneumatic cylinder 44 is carried by a respective prestressing cylinder cradle 46 that is disposed on a respective channel 47. Channel 47 is shaped substantially identically to the other channels 25 except that ends of the channel 47 are secured to and supported by either the first or second ends of the table top 22.

As thus described, the lateral ends of at least a portion of the assembly (such as the bottom or lower chord) may be pressed between the cylinder plate (piston head) of the cylinder 44 and the stop 45 for prestressing said portion (preferably the bottom chord) of the assembly.

It is preferred that the pressure applied by the piston head of the cylinder 44 be selectively adjustable, by means well known to those skilled in the art, so that the amount of prestressed camber in the chord (the bottom or lower chord) and the assembly as a whole may be selectively adjusted.

Like the cylinders 28, the cylinder 44 is connected to the primary air feed line 30 via a respective air line 29. Also like the cylinders 28, the air flow to (and hence the operation of) the cylinder 44 is controlled by the rod 31. In this respect, it is noted that such an arrangement provides one air system for operating all of the cylinders 28 and 44 of the device. This provides, inter alia, a safety stop feature.

It is noted herein that while described herein as pneumatic cylinders, any means well known to those skilled in the art that applies pressure may be utilized. Such means would include hydraulic cylinders and manual clamps.

Figure 10:
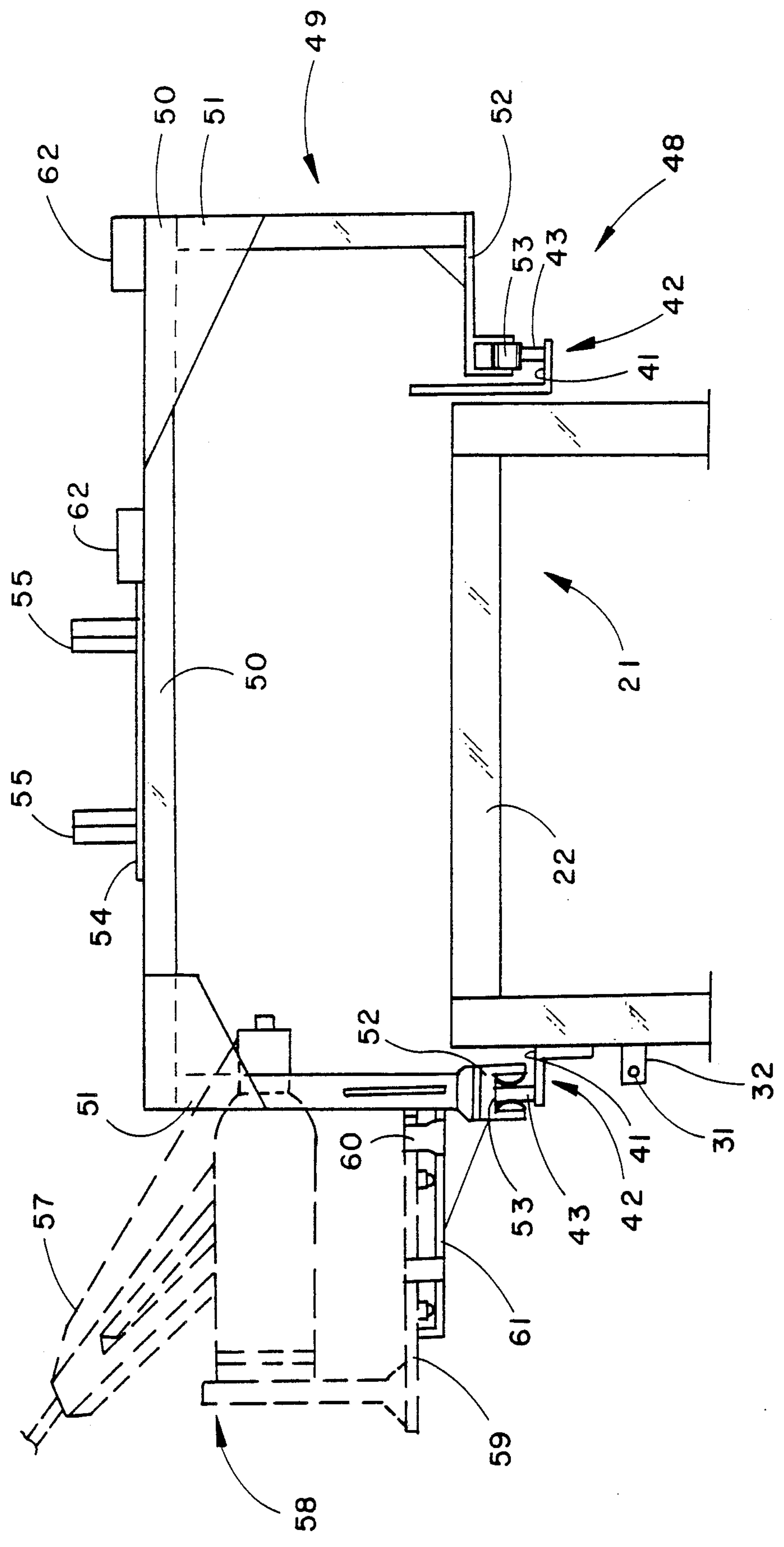
FIG. 10 is an end view of the device of FIG. 5 with the platform and staple gun depicted therein in phantom lines for the sake of clarity.
Figure 11:
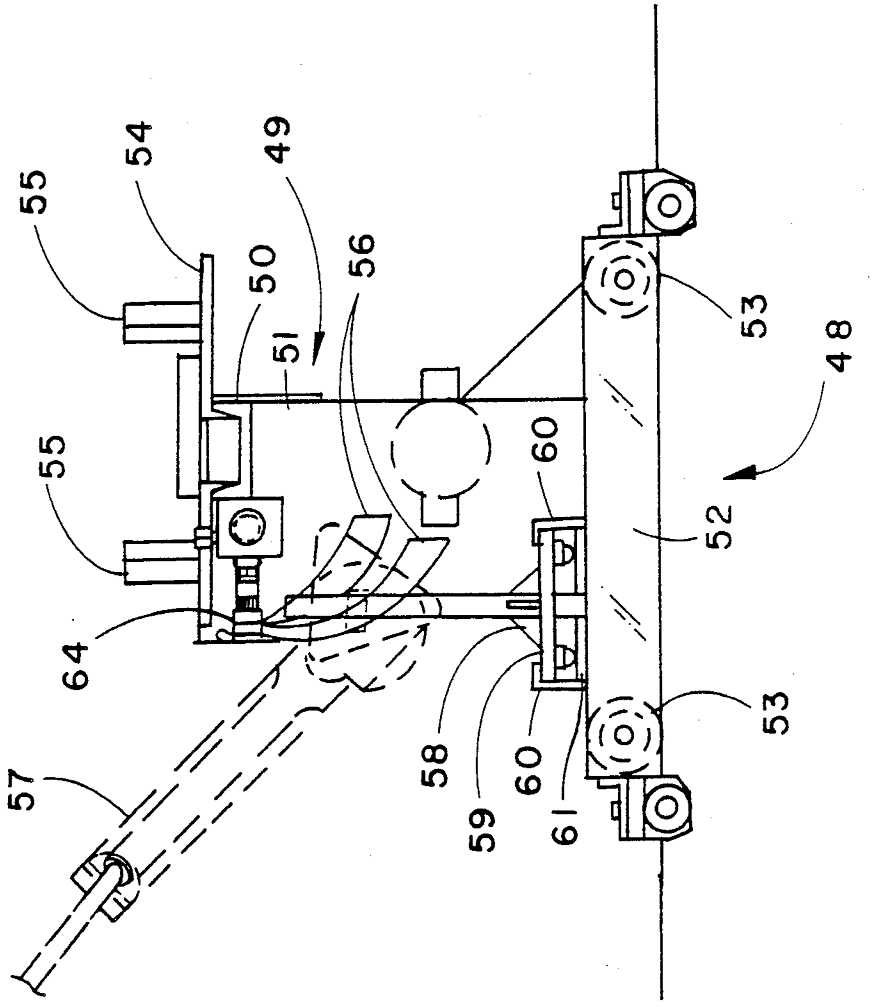
FIG. 11 is a side view of the movable bridge, as seen from the left side of FIG. 10.

Referring now to FIGS. 5 and 10–11, the structure and operation of the movable bridge 48 of the present invention is now discussed. The movable bridge 48 is a preferred embodiment which improves efficiency and accelerates production. However, the present invention is not limited to the use of the movable bridge 48.

The movable bridge 48 includes a frame 49 having an upper, inverted U-shaped channel 50. Channel 50 is disposed above the table top 22, extending across the width, between the front and back edges, of the top 22. The channel 50 is oriented extending laterally across the table top 22, such that the ends (the front and back ends) of the channel 50 overhang the front and back edges of the top 22. The upper channel 50 is supported, at both ends thereof, by a respective leg 51 that extends downwardly therefrom beyond (below) the table top 22. The bottom of each of the legs 51 are secured to a respective longitudinal base 52 that includes respective carriage wheels 53. The wheels 53 are associated with the respective guide channels 41 being guided by mating with the longitudinal guide rails 43 that extend along the front and back edges of the top 22. In this fashion, the bridge 48 may be longitudinally moved along the length of the table between the first and second ends of the top 22. In the embodiment illustrated, the channel 50 and the legs 51 are $1\frac{3}{4}\times 3''$ in shape.

Disposed on and carried by the upper channel 50 is an adhesive fastener means. This means includes a glue pot base 54. The base 54 has a plurality of upwardly-extending glue pot brackets 55 carried thereon. The glue pot brackets 55 permit the secure positioning of a glue pot reservoir 63 (see FIG. 5) on the bridge 48, so that the glue pot reservoir 63 longitudinally moves concomitantly with the bridge 48.

Also carried by the bridge 48 for concomitant longitudinal movement therewith are a pair of glue spreaders 56. Spreaders 56 are in communication with and are fed by the glue in the glue pot reservoir. The spreaders 56 extends downwardly from the glue pot reservoir 63 for contacting at least a portion of the assembly being produced, and for applying glue thereto. If desired, the glue pot reservoir 63 may be provided with a spray nozzle 64 through which the means for dispensing the glue is automatically controlled. In this fashion, adhesive means, such as glue, may be applied to at least a portion of the assembly, as desired, along the longitudinal length thereof.

Carried by one of the legs 51 of the bridge 48 is a mechanical fastener means, such as the pneumatic staple gun 57. The staple gun 57 is carried by an adjustable gun platform 58 that is, in turn, carried by a gun mount 59. Vertical adjustability of the gun 57 is provided along the height of the platform 58 by any suitable means. Horizontal adjustability of the gun 57 is provided by means of a gun guide 60 that is carried by a gun mount plate 61. A portion of the mount 59 is slidably adjustably received in the guide 60 for lateral horizontal movement thereof and the gun carried thereby.

In the embodiment illustrated in the drawings, the gun mount 59 is $5\frac{1}{2}'' \times 10\frac{1}{2}'' \times \frac{3}{8}''$ in size.

Finally, if desired, a pair of gun holders 62 may also be carried on the channel 50. These holders are sized so as to receive the gun 57 (or an auxiliary gun) therein when it (the gun 57) is not in use. In the illustrated embodiment, the gun holders 62 are $3'' \times 5''$ in size.

Referring in particular now to FIGS. 12–18, the method of the present invention, wherein the device 20, described above with reference to FIGS. 5–11, is utilized to produce the wood beam assemblies 10 described above with reference to FIGS. 1–4 is discussed.

First, the appropriately sized and shaped components required to provide the desired assembly are prepared and collected. As seen in the Figures, the method will henceforth be explained with reference to an I-beam (the I-beam seen in FIG. 1). Such an assembly 10 includes a web 11, a top chord 12, a bottom chord 13 and, if desired, a reinforcing method (not shown).

Figure 12:
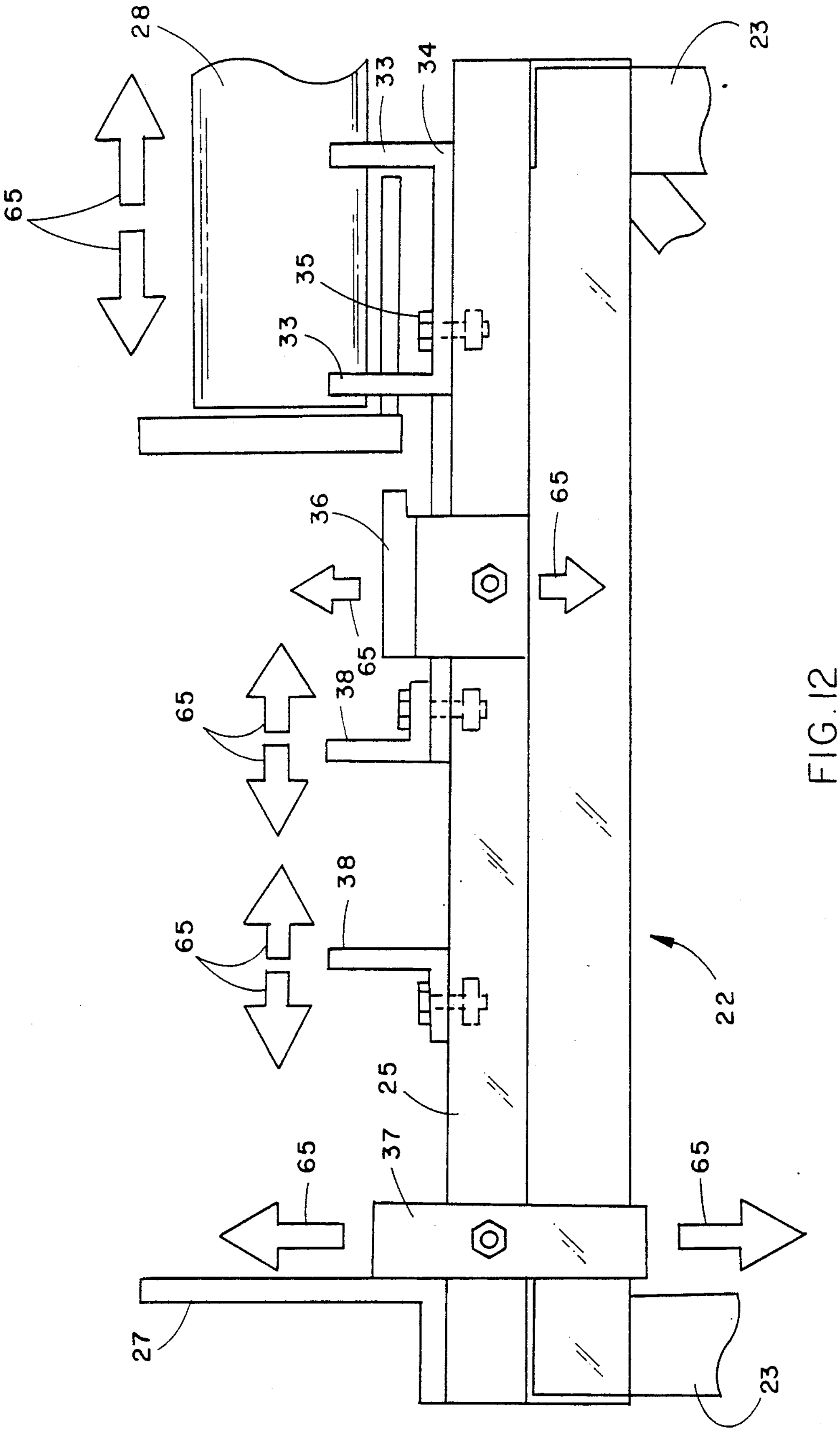
FIGS. 12–18 illustrate the method of the present invention wherein the device shown in FIGS. 5–11 is used to produce the assembly shown in FIGS. 1–4.

With reference to FIG. 12, the horizontal and vertical positioning of the adjusters 36–38 is selectively adjusted, as described above in the direction of the arrows 65, to precisely suit the desired shape and size of the assembly 10 to be produced. In this respect, it is noted that the web adjusters 38 define a web support means for supporting the web 11 at a uniform desired height above the table 21. It is further noted that such means 38 are adjustable to support the web 11 at a uniform height along the length of the table 21. Further in this respect, it is noted that the adjusters 36 and 37 define respective chord support means for supporting the respective chords thereon at a desired uniform height above the table 21. It is further noted that such means 36 and 37 are adjustable to support the respective chords 12 or 13 at a uniform height along the length of the table 21.

Figure 13:
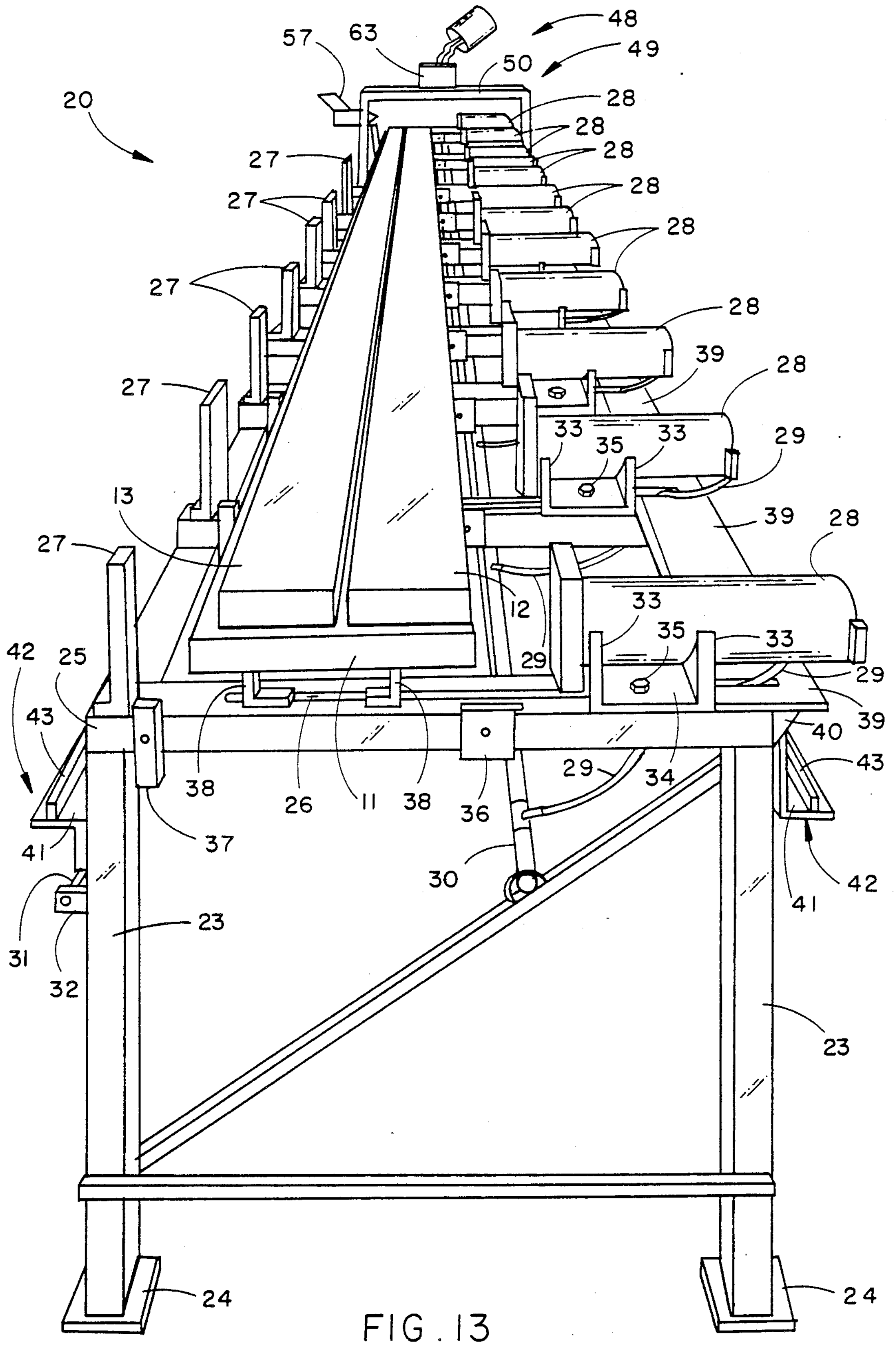

Referring now to FIG. 13, the web 11 is then placed longitudinally on the web adjusters 38 with the top edge of the width being oriented toward the back-edge of the table top 22 and with the bottom edge of the width being oriented towards the front edge of the table top 22. The chords 12 and 13 are then longitudinally placed on the web 11, so that the width of each chord 12 and 13 faces upwardly towards the bridge 48.

If desired, the horizontal and vertical positioning of the stops 27 and/or cylinders 28 may be adjusted (in the direction of the arrows 65 shown in FIG. 12) so as to contact, press and/or hold the components 11, 12 and 13 in place therebetween. In this event, the air supply to the cylinders 28 is then manually activated by moving the rod 32.

Figure 14:
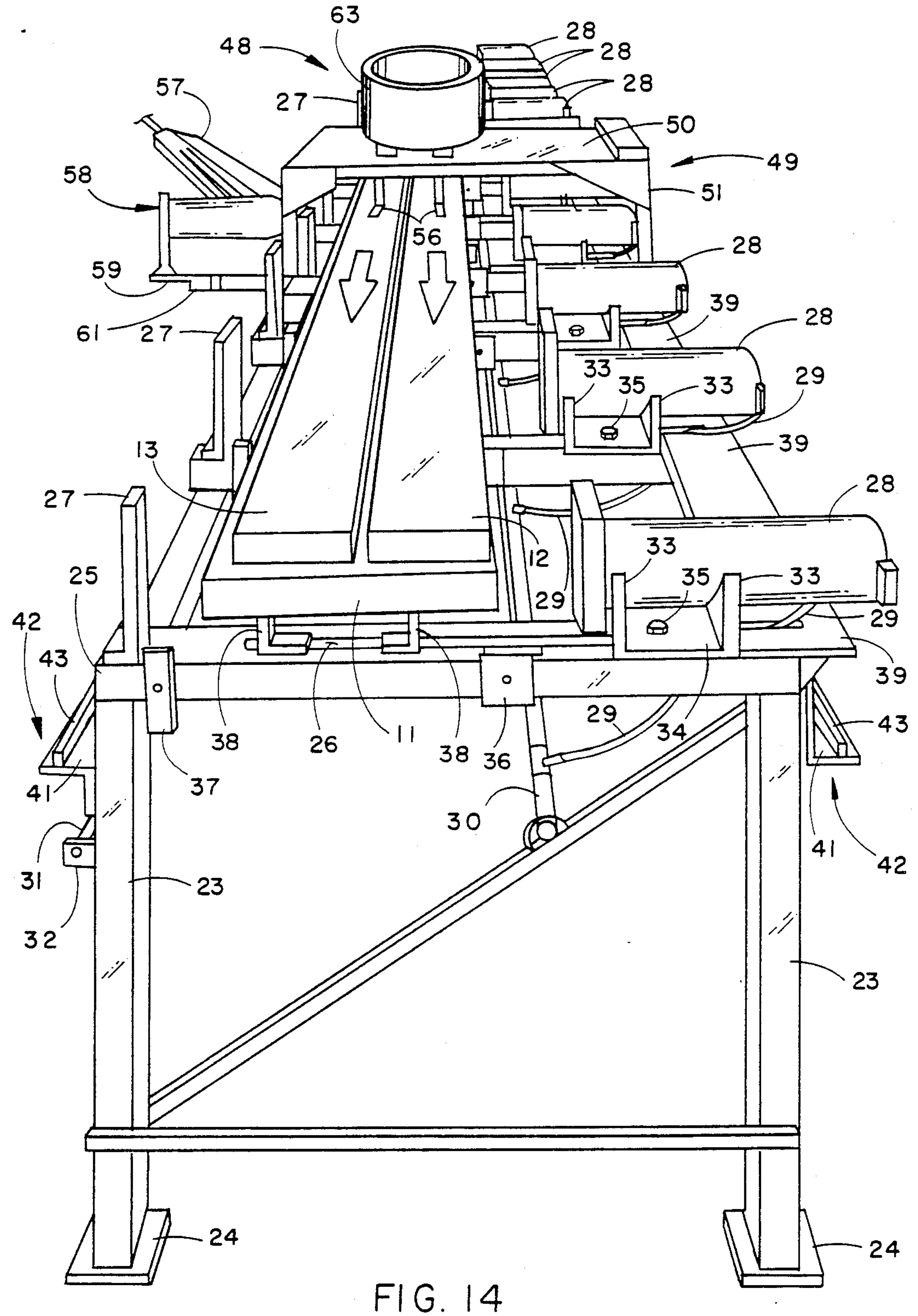

With reference now to FIG. 14, if used, the glue pot reservoir 63 is placed in its appropriate place within the brackets 55 on the base 54 that is carried by the bridge 48. Furthermore, the mechanical fastener means (the staple gun) 57 is loaded with the appropriate mechanical fasteners (such as staples), as will be required. The bridge 48 is then moved along the length of the chords 12 and 13, so as to pass over the top of the table. As the bridge pass starts, the attendant turns on the nozzle 64 of the glue pot 63, so that glue is dispensed on the glue spreaders 56. In this manner, adhesive means (such as glue) is applied in a predetermined width to the upwardly-facing width of each chord 12 and 13.

If utilized, the air supply is deactivated by the use of the rod 32 after the pass of the bridge 48.

Figure 15:
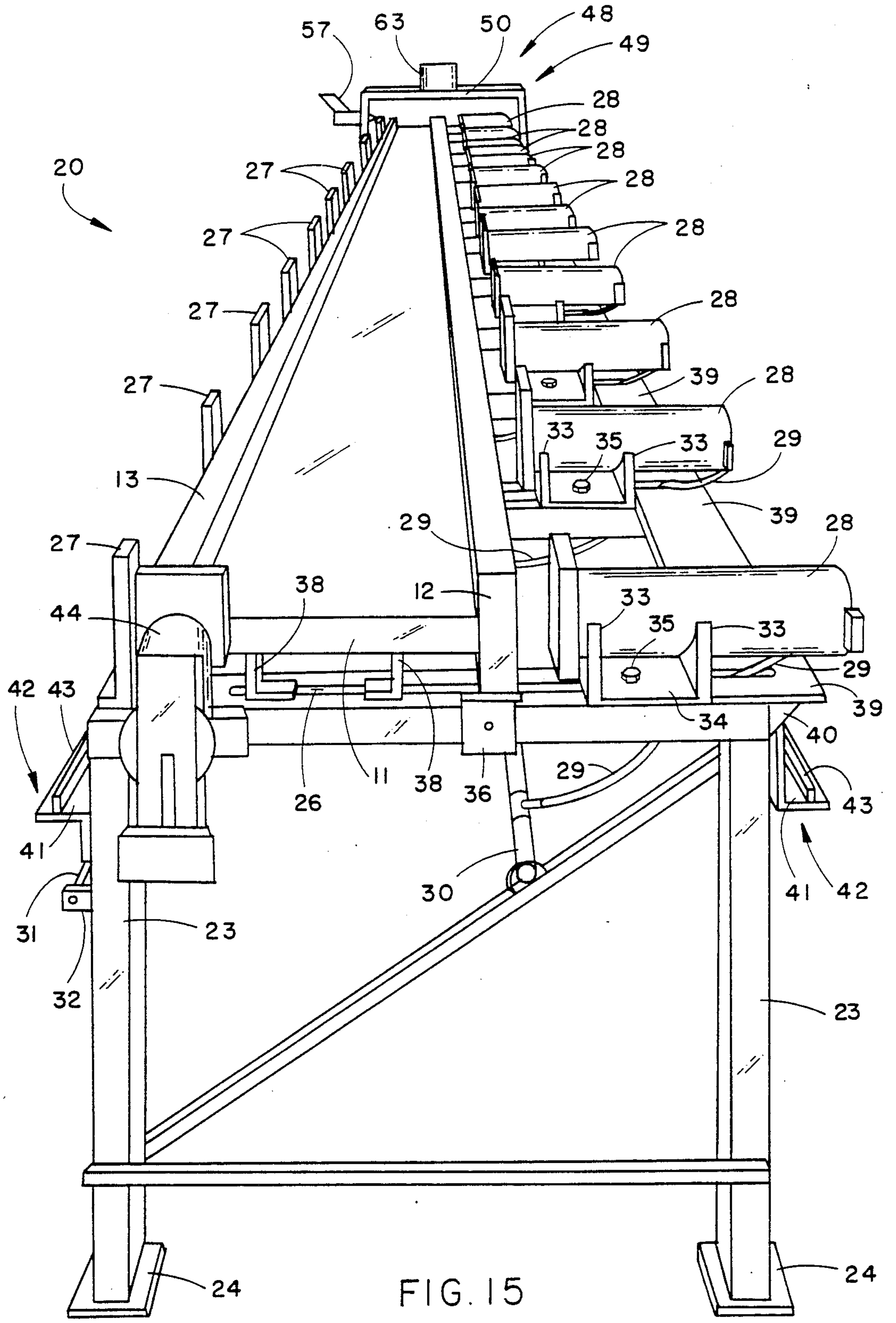
Figure 16:
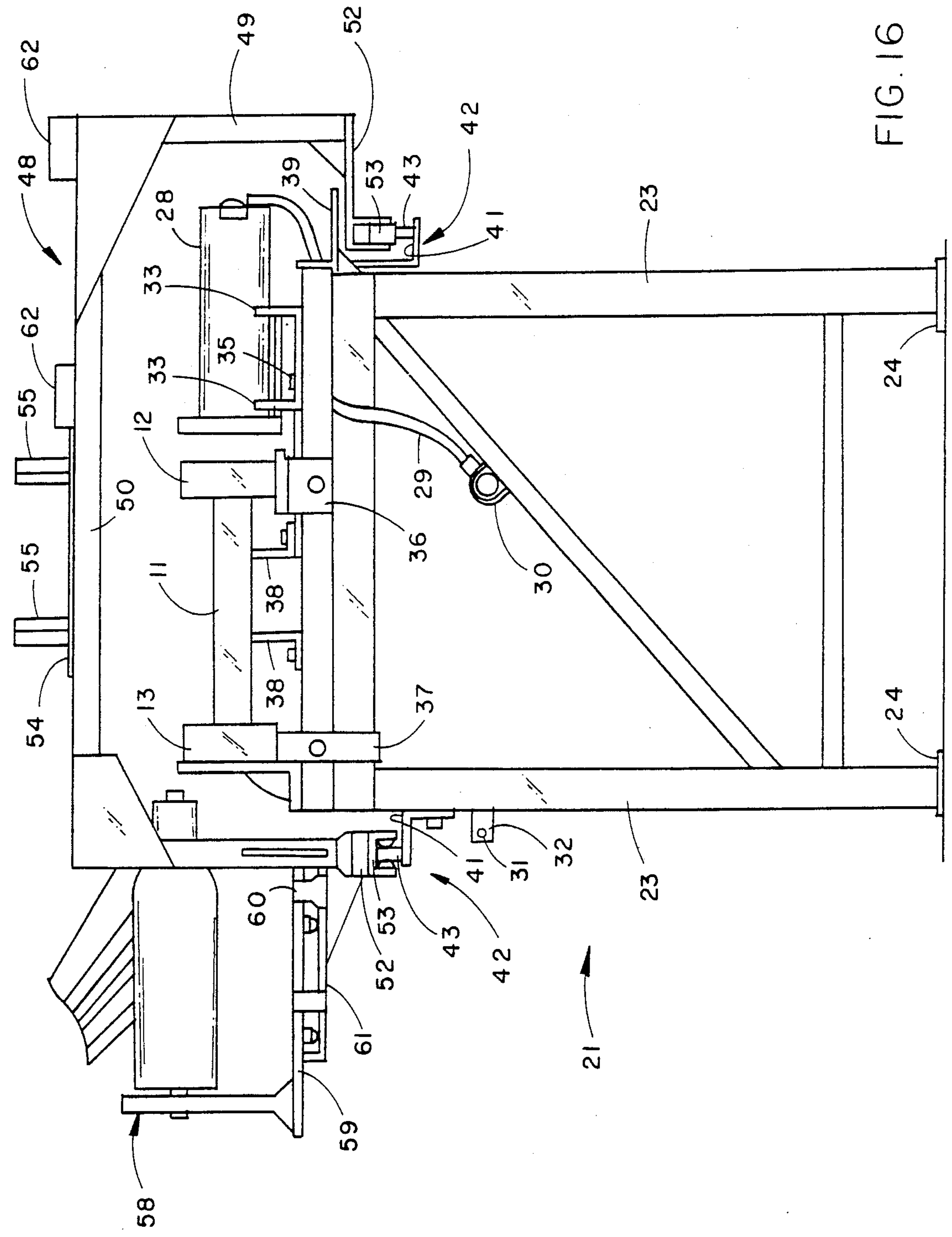

Referring now to FIGS. 15–16, one of the chords 12 or 13 (preferably top chord 12) is then, (after insertion of the reinforcing material such as a steel bar in the space or dado groove if such material is provided), is placed longitudinally on the flange adjusters 36 or 37 at the top edge of the web 11. The other of the chords 12 and 13 (preferably bottom chord 13) is placed longitudinally on the other flange adjusters 36 or 37 at the bottom edge of the web 11, so that the chords 12 and 13 are substantially perpendicular to the web 11. In this manner, the glued width of each chord 12 and 13 contacts the respective edges of the web 11 substantially in the center of the width of each chord 12 and 13.

Next, any irregularities in the height above the table 21 of the web 11 and the chords 12 and 13 are adjusted using adjusters 36–38.

Figure 17:
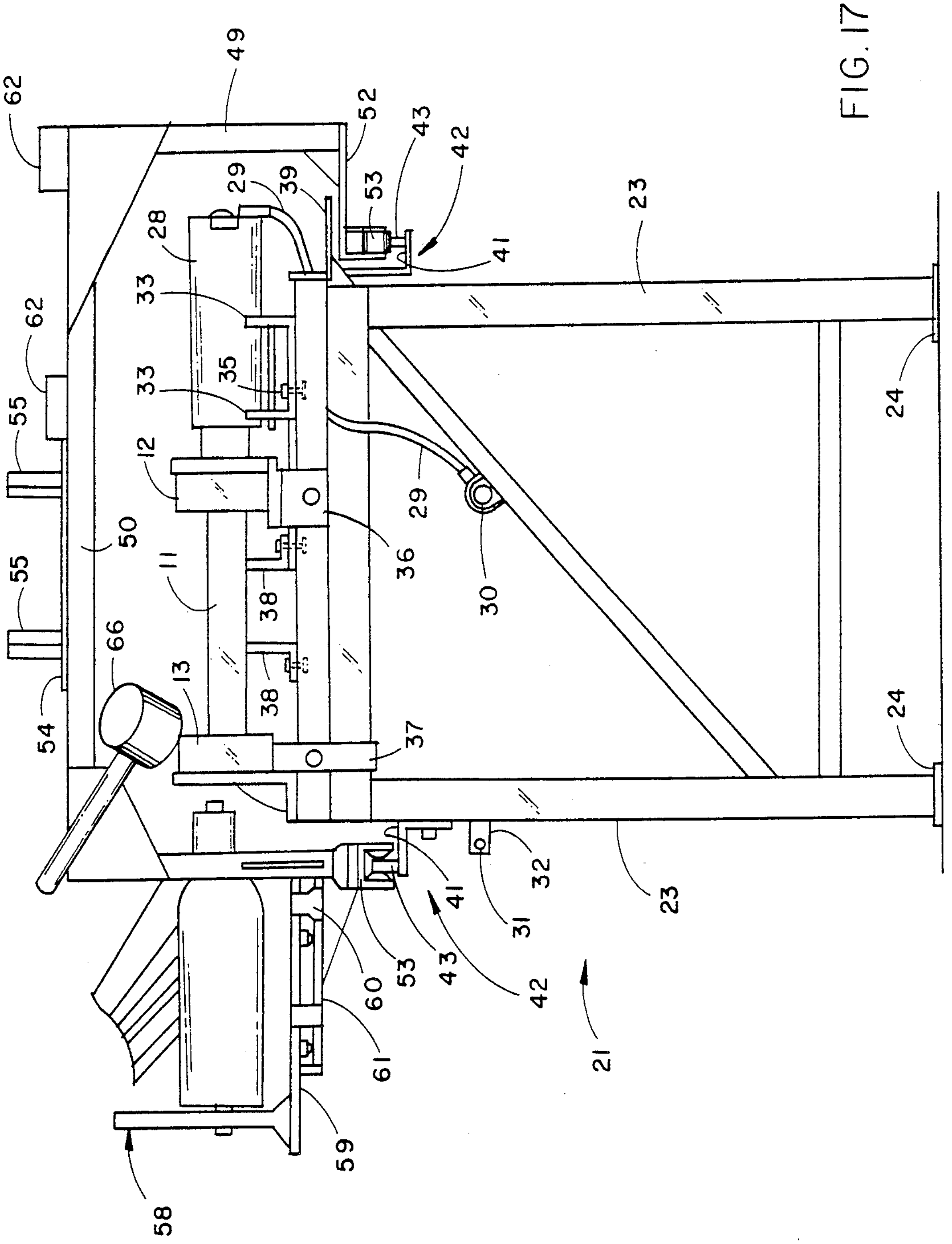

Referring now to FIG. 17, finally, the cylinders 28 and 48 and the stops 27 and 45 are adjusted, so as to contact a portion of the assembly. Then the cylinders 28 and 48 are activated (actuated) by the rod 32. In this fashion, the piston head of each cylinder 28 contacts the one chord at the top of the web 11 while the stops 27 contact the other chord at the bottom of the web 11. The pressure exerted by the piston head of the cylinder 28 compresses the web 11 and the two chords 12 and 13, such that the "I"-shaped beam is formed and held in place under pressure. Further in this fashion, the piston head of the prestressing cylinder 44 applies pressure (stress) on at least a portion of the bottom chord 13 of the assembly 10, between the cylinder 44 and the prestressing stop 45. In this fashion, stress is applied to at least a portion of the chord 13 of the assembly along the length thereof at the bottom of the web 11, for forming a prestressed wood beam assembly. Final positioning and alignment of the chords 12, 13 and web 11 is effecuated by use of, i.e., a mallet 66.

Figure 18:
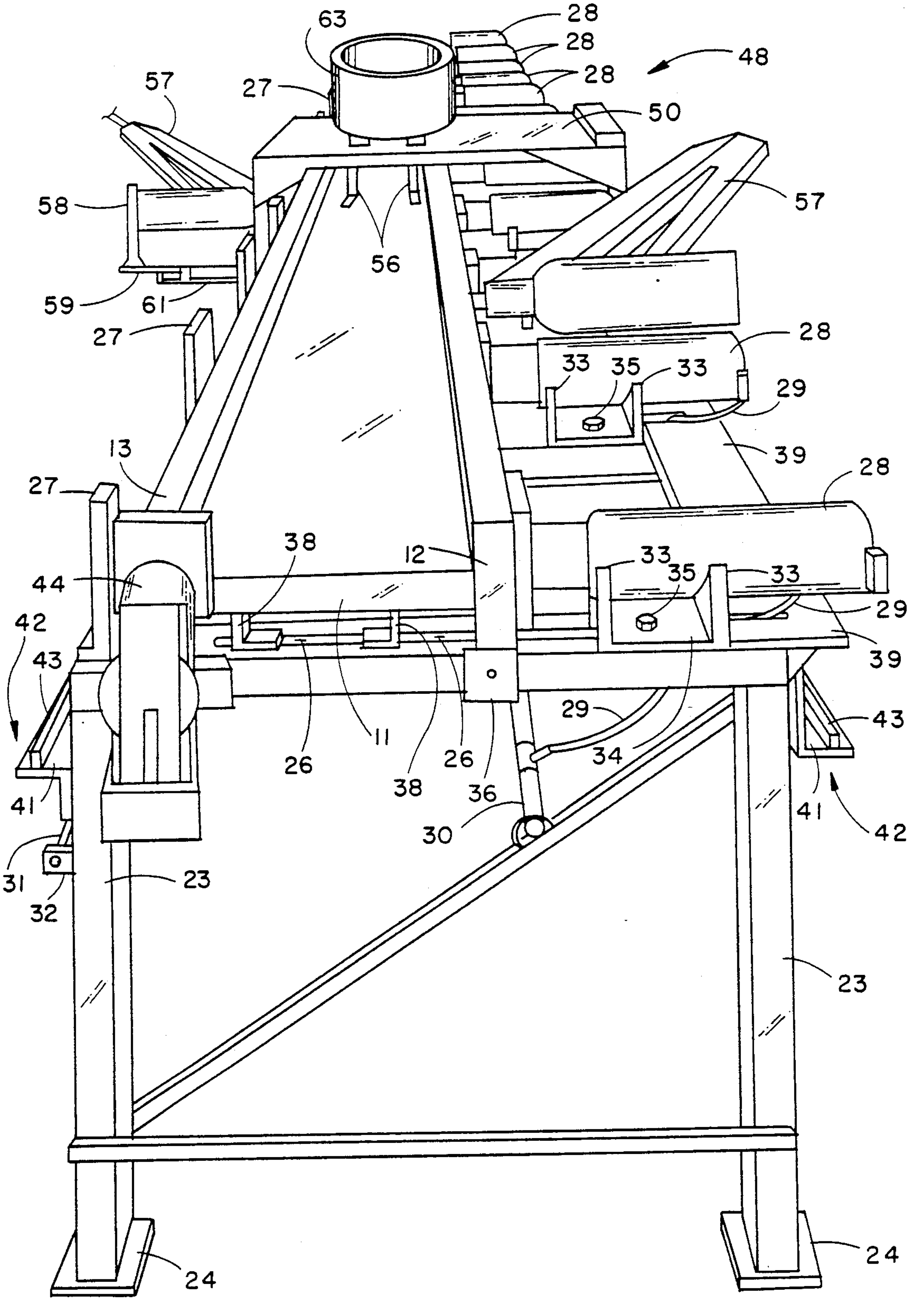

Referring now to FIG. 18, the gun 57 (and the auxiliary gun, if desired) is removed from the gun rest 39. The bridge 48 is then again moved along the length of the chords 12 and 13, and the mechanical fastener means (staples) are applied in the respective chords 12 and 13 at desired selected predetermined locations. Preferably, the locations are those recommended by the applicable quality control manual. In this regard, the adjustability provided to the gun 57, as discussed above permits and aids each mechanical fastener to be placed at precisely the correct height and angle. In this fashion, the fasteners (staples) are placed in the chords 12 and 13 at selected predetermined locations, such that the fasteners further hold the web 11 to the respective chords 12 and 13.

Once the mechanical fastening means (staples) have been applied as described above, the air supply and hence the cylinders 28 and 44 are deactivated by use of the rod 32.

The prestressed wood beam assembly 10 produced may then be removed from the device. In this manner, a flexurally-reinforced prestressed I-beam assembly that is secured by adhesive means (glue) and/or mechanical fasteners (staples) is provided.

As can be seen, with the above described device 20 and method all steps can be performed to produce a finished wood beam assembly utilizing only the device 20, without the need for utilizing any further devices. Also, no additional steps are necessary for air drying and/or curing. Thus, the time required to produce the wood beam assembly can be very quick, taking as little as 1½ minutes to complete.

Thus, it can be seen that the device 20 produces the only I-Beam assembly that is a finished product. It can further be seen that the device produces the only prestressed I-Beam assembly. Finally, the device 20 produces the only I-Beam assembly that is constructed with a mechanical fastener.

Obviously, many modifications may be made without departing from the basic spirit of the present invention. Accordingly, it will be appreciated by those skilled in the art that within the scope of the appended claims, the invention may be practiced other than has been specifically described herein.

What is claimed is:

1. A device for producing a wood material beam assembly having a web section and at least one chord, the device comprised of:

a support including a top for receiving and supporting the assembly thereupon, the top having a pair of side edges with a width therebetween and a pair of end edges with a length therebetween;

a movable bridge positioned extending over the top along the width thereof, the bridge being carried by the support for movement of the bridge along the length of the top;

means carried by the movable bridge for securing the web section and the chords to one another, whereby the wood beam assembly is formed, said means being movable with the bridge along the length of the top.

2. The device of claim 1, further comprised of:

a plurality of securing cylinders disposed spaced along one of the side edges of the top, so as to face the other side edge of the top; and a plurality of securing stop plates disposed spaced along the other of the side edges of the top, so that each securing stop plate is aligned substantially opposite a respective securing cylinder; and such that when an assembly is disposed on the top of the support, the assembly is contacted and secured in place between the securing cylinders and the securing stop plates for securing the assembly in position on the top.

3. The device of claims 1, further comprised of:

a plurality of chord adjusters movably carried by the support for selective vertical and horizontal adjustment thereof into the desired selected position for receiving and supporting the chords of the assembly thereon in the respective desired selected positions thereof; and a plurality of web adjusters movably carried by the support for selective vertical and horizontal adjustment thereof into the selected desired position for receiving and supporting the web of the assembly thereon in the respective desired selected position thereof;

whereby the selected vertical and horizontal adjustment of the chords and the web may be easily provided in response to the size and shape of the chords and the web.

4. A device for producing a prestressed wood material beam assembly having a web section and at least one chord, the device being comprised of:

a support including a top for receiving and supporting the assembly thereupon, the top having a pair of side edges with a width therebetween and a pair of end edges with a length therebetween;

prestressing means carried by the support for prestressing at least one of the chords;

a movable bridge positioned extending over the top along the width thereof, the bridge being carried by the support for movement of the bridge along the length of the top;

means for securing the web section and the chords to one another, whereby the prestressed wood beam assembly is formed, said means being movable with the bridge along the length of the top.

5. The device of claim 4, wherein the means for securing the web section and the chords to one another is carried by the bridge for movement therewith along the length of the top.

6. The device of claim 4, further comprised of:

adjustment means for selectively adjusting the vertical and horizontal positioning of the chords on the top of the support and the web, such that the chords and web are disposed in respective desired selected positions.

7. The device of claim 6, wherein the adjustment means for selectively adjusting the vertical and horizontal positioning of the chords and the web is comprised of:

a plurality of chord adjusters movably carried by the support for selective vertical and horizontal adjustment thereof into the desired selected positions thereof for receiving and supporting the chords of the assembly thereon in the respective desired selected positions thereof; and a plurality of web adjusters movably carried by the support for selective vertical and horizontal adjustment thereof into the desired selected position for receiving and supporting the web of the assembly thereon in the respective desired selected positions thereof;

whereby the selected vertical and horizontal adjustment of the chords and the web may be easily provided in response to the size and shape of the chords and the web.

8. The device of claim 4, further comprised of:

securing means carried by the support for removably securing the assembly in position on the top.

9. The device of claim 8, wherein the securing means for removably securing the assembly in position on the top is comprised of:

a plurality of securing cylinders disposed spaced along one of the side edges of the top, so as to face the other side edge of the top; and a plurality of securing stop plates disposed spaced along the other of the side edges of the top, so that each securing stop plate is aligned substantially opposite a respective securing cylinder;

such that when an assembly is disposed on the top of the support, the assembly is contacted and secured in place between the securing cylinders and the securing stop plates for securing the assembly in position on the top.

10. The device of claim 4, further comprised of:

a pair of guide rails carried by the support, one of said guide rails being located extending along each respective side edge of the top; and wherein the movable bridge includes wheels that mate with the respective guide rails for providing the movement of the bridge along the length of the support.

11. The device of claim 4, wherein the means for securing the chords and the web section to one another includes an adhesive and a means for applying the adhesive to the chords.

12. The device of claim 11, wherein the adhesive is glue and wherein the means for applying the glue includes a glue pot carried by the bridge for movement therewith along the length of the top, a glue spreader in communication with the glue in the glue pot for applying the adhesive to the chords.

13. The device of claim 12, further including a forced air supply for placing the glue in the glue pot in communication with the glue spreader.

14. The device of claim 4, wherein the means for securing the chords to the web station includes mechanical fastener means for applying a mechanical fastener between the chords and the web.

15. The device of claim 14, wherein the mechanical fastener means is a staple gun including staples for applying the staples between the chords and the web.

16. The device of claim 4, wherein the prestressing means for prestressing at least a portion of one of the chords is comprised of:

a prestressing stop plate disposed on one of the end edges of the top, so as to be carried by the support, the prestressing stop plate positioned for contacting the one of the chords;

a prestressing cylinder disposed on the other of the end edges of the top, so as to be carried by the support, the prestressing cylinder positioned for contacting at least a portion of one of the chords opposite of the prestressing stop plate whereby the one chord is prestressed between the prestressing cylinder and the prestressing stop plate.

17. The device of claim 16, wherein the prestressing cylinder of the prestressing means is a pneumatic cylinder.

18. The device of claim 9, wherein the securing cylinders of the securing means for removably securing the assembly in position on the top are pneumatic cylinders.

19. The device of claim 4, wherein the means for securing the chords and the web section to one another includes an adhesive and a means for applying the adhesive to the chords, and a mechanical fastener means for applying a mechanical fastener between the chords and the web.

20. The device of claim 19, wherein the adhesive is glue and wherein the means for applying the adhesive includes a glue pot carried by the bridge for movement therewith along the length of the top, a glue spreader in communication with the glue in the glue pot for applying the adhesive to the chords and further wherein the mechanical fastener means is a staple gun including staples for applying the staples between the chords and the web.

21. A device for assembling a flexurally-reinforced prestressed wood material beam assembly having a top chord, a bottom chord and a web section therebetween, the device comprised of:

a support including as top for receiving and supporting the assembly thereupon, the top having a pair of side edges with a width therebetween and a pair of end edges with a length therebetween;

adjustment means for selectively adjusting the vertical and horizontal position of the top chord, the bottom chord and the web on top of the support, such that the chords and the web are disposed in respective desired selected positioned;

a prestressing stop plate disposed on one of the end edges of the top, so as to be carried by the support, the prestressing stop plate positioned for contacting the bottom chord;

a prestressing pneumatic cylinder disposed on the other of the end edges of the top, so as to be carried by the support, the prestressing pneumatic cylinder positioned for contacting the bottom chord substantially opposite of the prestressing top plate, whereby the bottom chord is prestressed between the prestressing pneumatic cylinder and the prestressing stop plate;

a movable bridge positioned extending over the top along the width thereof, the bridge being carried by the support for movement of the bridge along the length of the top; and means carried by the bridge for securing the chords to the web section, said means being movable with the bridge along the length of the top, said means including an adhesive and a means for applying the adhesive to the chords and a mechanical fastener means for applying a mechanical fastener between the chords and the web, wherein the adhesive is glue and wherein the means for applying the adhesive includes a glue pot carried by the bridge for movement therewith along the length of the top, a glue spreader in communication with the glue in the glue pot for applying the adhesive to the chords, and further wherein the mechanical fastener means is a staple gun including staples for applying the staples between the chords and the web.

22. The device of claims 21, further comprised of:

a plurality of top chord adjusters movably carried by the support for selective vertical and horizontal adjustment thereof into desired selected position for receiving and supporting the top chord of the assembly thereon in the respective desired selected position thereof;

a plurality of bottom chord adjuster movably carried by the support for selective vertical and horizontal adjustment thereof into desired selected position for receiving and supporting the bottom chord of the assembly thereon in the respective desired selected position thereof; and a plurality of web adjusters movably carried by the support for selective vertical and horizontal adjustment thereof into the desired selected position for receiving and supporting the web of the assembly thereon in their respective desired selected positioned thereof;

whereby the selected vertical and horizontal adjustments of the top chord, the bottom chord and the web may be easily provided in response to the size and shape of the chords and the web.

23. A device for producing a prestressed wood material beam assembly having a web section and at least one chord, the assembly having a length, the device comprised of:

a support including a top for receiving and supporting the assembly thereupon, the top having a pair of side edges with a width therebetween and a pair of end edges with a length therebetween;

means on the top of the support for selective vertical and horizontal adjustment of the at least one chord into the desired selected position for receiving and supporting the at least one chord of the assembly thereon in the respective desired selected position thereof;

means on the top of the support for selective vertical and horizontal adjustment of the web section into the selected desired position for receiving and supporting the web of the assembly thereon in the respective desired selected position thereof;

whereby the selected vertical and horizontal adjustment of the at least one chord and the web section may be easily provided in response to the size and shape of the at least one chord and the web;

means for securing the assembly on the top of the support between the side edges of the top of the support, the length of the assembly extending between the end edges of the top of the support;

prestressing means carried by the support for prestressing the at least one chord; and means for securing the web section and the at least one chord to one another, whereby the prestressed wood material beam assembly is formed.

24. The device of claim 23 further comprising:

a movable bridge positioned extending over the support along the width thereof, the bridge being carried by the support for movement of the bridge along the length of the top of the support; the means for securing the web section and the at least one chord to one another being carried by the movable bridge.

25. A method for producing a wood material beam assembly having a web section and at least one chord, the method comprised of the steps of:

selectively adjusting the vertical and horizontal positioning of chord adjusters and web adjusters that are movably carried by a support into a desired selected position for receiving and supporting the web and the chords of the assembly thereon in the respective desired selected positions thereof;

placing the web and the chords on the web adjusters, such that the web and the chords are positioned at the respective desired selected positions thereof;

moving a bridge carrying fastener means along at least a portion of the chords and web and applying fastener means between the chords and the web, such that a wood material beam assembly is produced.

26. The method of claim 25, wherein the fastener means are mechanical fasteners and wherein the method is further comprised of:

moving the bridge and the mechanical fastener means along at least a portion of the length of the chord and applying mechanical fastening means, such that the chords and the webs are mechanically fastened to one another.

27. A method of producing a wood material beam assembly having a web and at least one chord, the web having a desired width and thickness, the width having a top edge and a bottom edge, each chord having a desired length and thickness, each chord being substantially perpendicular to the respective edges of the web, the method comprised of the steps of:

selectively adjusting the horizontal and vertical positioning of chord adjusters and web adjusters that are movably carried by a support having opposite front and back edges, opposite first and second ends, a movable bridge including a fastener means carried by the support so as to be disposed thereabove, whereby the bridge is movable along the length of the support, said chord and web adjusters being adjusted so as to receive the chords and the webs thereon at a desired selected height above the table;

placing the web and the chords longitudinally on the adjusters, wherein the top edge of the width of the web is oriented toward the back edge of the table and the bottom edge of the width being oriented toward the front edge of the support, and wherein the chords are disposed longitudinally relative to the web, the width of each chord facing upwardly;

moving the bridge and the fastener means along at least a portion of the length of the chord and applying the fastener means to the upward facing width of each chord;

placing the chords longitudinally on the chord adjusters, such that the chords are disposed at the edges of the web, and further such that the fastener means on the width of each chord contacts the respective edge of the web with the chords being substantially perpendicular to the web;

selectively adjusting the horizontal and vertical positioning of the chord adjusters and the web adjusters, so as to receive and position the chords and webs thereon at desired selected heights above the support; and moving the bridge and the fastener means along at least a portion of the length of the chord and applying fastener means to the chord and the web, whereby the flexurally-reinforced wood material I-beam assembly is produced.

28. The method of claim 27, wherein the support further includes a plurality of securing stops disposed on the front edge of the support and a plurality of securing cylinders including respective piston heads disposed on the back edge of the support and wherein the method further comprises the steps of:

selectively adjusting and actuating the securing stops and the securing cylinders that are carried by the support before moving the bridge, such that the chords and the web are held therebetween; and deactivating the securing cylinders after producing the wood beam assembly, so that the assembly can be removed therefrom.

29. The method of claim 27, wherein the fastener means includes an adhesive fastener means and a mechanical fastener means, and wherein the method further comprises the steps of:

moving the bridge and the adhesive fastener means along at least a portion of the length of the chord and applying the adhesive fastener means to the upward facing width of each chord; and moving the bridge and the mechanical fastener means along at least a portion of the length of the chord and applying mechanical fastener means to the chord and the web, whereby the wood beam assembly is produced.

30. A method of producing a prestressed wood material beam assembly having a web and at least one chord, the method comprised of the steps of:

selectively adjusting the vertical and horizontal positioning of chord adjusters and web adjusters that are movably carried by a support into a desired selected position for receiving and supporting the web and the chords of the assembly thereon in the respective desired selected positioned thereof;

placing the web on the web adjusters, such that the web is positioned at the respective desired selected positions thereof;

placing the chords on the chord adjusters, such that the chords are positioned at the respective desired selected positions thereof; and selectively adjusting the vertical and horizontal positioning of a prestressing stop and a prestressing cylinder carried by the support, so that at least a portion of one of the chords is disposed therebetween;

selectively activating the prestressing cylinder before moving the bridge, such that the at least one chord received therebetween is prestressed;

moving a bridge including a fastener means along at least a portion of the length of the chords and applying fastener means between the chords and the web, whereby the prestressed wood beam assembly is produced; and selectively deactivating the prestressing cylinder after moving the bridge and producing the prestressed wood beam assembly, such that the prestressed wood beam assembly produced thereby may be removed therefrom.

31. A method of producing a prestressed wood material beam assembly having a web and at least one chord, the web having a desired width and thickness, the width having a top edge and a bottom edge, each chord having a desired length and thickness, each chord being substantially perpendicular to the respective edges of the web, the method comprised of the steps of:

selectively adjusting the horizontal and vertical positioning of chord adjusters and web adjusters that are movably carried by a table having opposite first and back edges, opposite first and second ends, a plurality of securing stops disposed on the front edge of the table, a plurality of securing cylinders including respective piston heads disposed on the back edge of the table, a prestressing stop disposed on the first end of the table, a prestressing cylinder including respective piston heads disposed on the second end of the table, a movable bridge including an adhesive fastener means and a mechanical fastener means, carried by the table, so as to be disposed thereabove, whereby the bridge and the adhesive and mechanical fastener means carried thereby is movable along the length of the table, said chord and web adjusters being adjusted, so as to receive the chords and webs thereon at a desired selected height above the table;

placing the web and the chords longitudinally on the adjusters, the top edge of the width of the web being oriented toward the back edge of the table and the bottom edge of the width being oriented toward the front edge of the table, and such that the chords are disposed longitudinally relative to the web, the width of each chord facing upwardly;

moving the bridge and the adhesive fastener means along at least a portion of the length of the chord and applying the adhesive fastener means to the upward facing width of each chord;

placing the chords longitudinally on the chord adjusters, such that the chords are disposed at the edges of the web, and further such that the adhesive fastener means on the width of each chord contacts the respective edge of the web with the chords being substantially perpendicular to the web:

selectively adjusting the horizontal and vertical positioning of the chord adjusters and the web adjusters, so as to receive and position the chords and webs thereon at desired selected heights above the table;

selectively adjusting and actuating the securing stops and the securing cylinders that are carried by the table before moving the bridge, such that the chords and the web are held therebetween;

selectively adjusting the horizontal and vertical positioning of the prestressing stop and prestressing cylinder, so that the at least one chord is at least partially received therebetween;

selectively activating the prestressing cylinder before moving the bridge, such that the at least one chord of the assembly received therebetween is prestressed;

moving the bridge and the mechanical fastener means along at least a portion of the length of the chord and applying the mechanical fastener means to the chord and the web, whereby the prestressed wood material beam assembly is produced;

deactivating the cylinders, including the prestressing cylinder, so that the prestressed wood material beam assembly is released therefrom.

32. A method of producing a prestressed wood material I-beam assembly having a web and two chords, the web having a desired length, width and thickness, the width further having a top edge and a bottom edge, each chord having a desired length, width and thickness, the width of each having a center and each chord being substantially perpendicular to the respective top and bottom edges of the web wherein the web is disposed substantially in the center of the width of each chord, comprising the steps of:

selectively adjusting the horizontal and vertical positioning of chord adjusters and web adjusters that are carried by a table having opposite first and back edges, opposite first and second ends, a plurality of securing stops disposed on the front edge of the table, a plurality of securing cylinders including respective piston heads disposed on the back edge of the table, a prestressing stop disposed on the first end of the table, a prestressing cylinder including a respective piston head disposed on the second end of the table, and a movable bridge including an adhesive fastener means and a mechanical fastener means, carried by the table so as to be disposed thereabove, whereby the bridge and the adhesive and mechanical fastener means carried thereby is movable along the length of the table, said chord and web adjusters being adjusted, so as to receive the chords and webs thereon at a desired selected height above the table;

placing the web and the chords longitudinally on the adjusters, the top edge of the width of the web being oriented toward the back edge of the table and the bottom edge of the width being oriented toward the front edge of the table, and such that the chords are disposed longitudinally relative to the web, the width of each chord facing upwardly;

moving the bridge and the adhesive fastener means along at least a portion of the length of the chord and applying the adhesive fastener means to the upward facing width of each chord;

placing the one chord longitudinally on the chord adjusters at the top edge of the web and placing the other chord longitudinally on the chord adjusters at the bottom edge of the web, such that the width of each chord having the adhesive fastener means thereon contacts the respective edge of the web, and such that the chords are substantially perpendicular to the web with the reinforcing means therebetween, the top edge of the web and the bottom edge of the web being substantially in the center of the width of each respective chord;

selectively adjusting the horizontal and vertical positioning of the chord adjusters and the web adjusters, so as to receive and position the chords and webs thereon at desired uniform heights above the table;

selectively adjusting and activating the securing stops and the securing cylinders that are carried on the back edge of the table, such that the piston heads of each securing cylinder contacts the one chord at the top of the web and compress the other chord at the bottom of the web against the stops on the front edge of the able such that the "I" shaped beam assembly is formed and held under pressure;

selectively adjusting and actuating the prestressing stops and prestressing cylinder, such that the piston head of the prestressing cylinder contacts the other chord at the bottom of the web, so that stress is applied between the prestressing cylinder and the prestressing stop, the stress being applied along the length of the other chord at the bottom of the web, such that the other chord is prestressed;

moving the bridge and the mechanical fastener means along at least a portion of the length of the chord and applying the mechanical fastener means to the chord and the web, whereby the prestressed wood material I-beam assembly is produced; and deactivating the cylinders, including the prestressing cylinder, so that the prestressed wood material I-beam assembly produced thereby is released therefrom.

* * * * *